US006859197B2

(12) United States Patent
Klein et al.

(10) Patent No.: US 6,859,197 B2
(45) Date of Patent: Feb. 22, 2005

(54) UNIVERSAL REMOTE CONTROL WITH DISPLAY AND PRINTER

(75) Inventors: Sandro D. Klein, Cypress, CA (US); Mauro Dresti, West Covina, CA (US); Robert A. Campbell, Costa Mesa, CA (US); Han-Sheng Yuh, Walnut, CA (US)

(73) Assignee: Universal Electronics Inc., Cypress, CA (US)

( * ) Notice: Subject to any disclaimer, the term of this patent is extended or adjusted under 35 U.S.C. 154(b) by 465 days.

(21) Appl. No.: 09/973,354

(22) Filed: Oct. 9, 2001

(65) Prior Publication Data

US 2002/0190956 A1 Dec. 19, 2002

Related U.S. Application Data

(60) Provisional application No. 60/288,192, filed on May 2, 2001.

(51) Int. Cl.[7] .............................. G09G 5/00; G09G 5/08
(52) U.S. Cl. ........................ 345/158; 345/156; 345/169
(58) Field of Search ................................ 345/156, 157, 345/158, 169, 173; 700/23, 48, 70, 76, 88; 705/14, 26, 27; 400/23, 48, 70, 76, 88

(56) References Cited

U.S. PATENT DOCUMENTS

| 4,828,406 | A | * | 5/1989 | Mosciatti et al. ............. 400/23 |
| 4,894,789 | A | | 1/1990 | Yee |
| 5,005,084 | A | | 4/1991 | Skinner |
| 5,302,970 | A | | 4/1994 | Lakso et al. |
| 5,307,055 | A | | 4/1994 | Baskin et al. |
| 5,410,326 | A | | 4/1995 | Goldstein |
| 5,574,964 | A | | 11/1996 | Hamlin |
| 5,648,760 | A | * | 7/1997 | Kumar ................... 340/825.25 |
| 5,671,267 | A | | 9/1997 | August et al. |
| 5,710,557 | A | * | 1/1998 | Schuette .................. 340/932.2 |
| 5,710,605 | A | | 1/1998 | Nelson |
| 5,724,106 | A | | 3/1998 | Autry et al. |
| 5,761,606 | A | | 6/1998 | Wolzien |
| 5,831,664 | A | | 11/1998 | Wharton et al. |
| 5,835,864 | A | | 11/1998 | Diehl et al. |
| 5,901,366 | A | | 5/1999 | Nakano et al. |
| 5,905,521 | A | | 5/1999 | Gatto et al. |
| 5,911,582 | A | | 6/1999 | Redford et al. |
| 6,002,450 | A | | 12/1999 | Darbee et al. |
| 6,040,829 | A | | 3/2000 | Croy et al. |
| 6,097,441 | A | | 8/2000 | Allport |
| 6,104,334 | A | | 8/2000 | Allport |
| 6,130,726 | A | | 10/2000 | Darbee et al. |
| 6,256,019 | B1 | | 7/2001 | Allport |
| 6,278,499 | B1 | | 8/2001 | Darbee et al. |
| 6,285,357 | B1 | | 9/2001 | Kushiro et al. |
| 6,517,266 | B2 | * | 2/2003 | Saund ......................... 400/88 |
| 6,587,835 | B1 | * | 7/2003 | Treyz et al. ................... 705/14 |

FOREIGN PATENT DOCUMENTS

| WO | WO 00/40016 | 7/2000 |
| WO | WO 00/58935 | 10/2000 |

OTHER PUBLICATIONS

PRONTO User Guide, Universal Electronics Inc., 1999, pp. 1–56.

* cited by examiner

*Primary Examiner*—Vijay Shankar
(74) *Attorney, Agent, or Firm*—Gary R. Jarosik

(57) ABSTRACT

Portable device to interface with a printer and with a computing device. The portable device may interface with a local printer through a base mated with the portable device or with a remote printer through a wireless communication link. The portable device preferably has standard remote control capability and web browsing capability.

17 Claims, 32 Drawing Sheets

1202

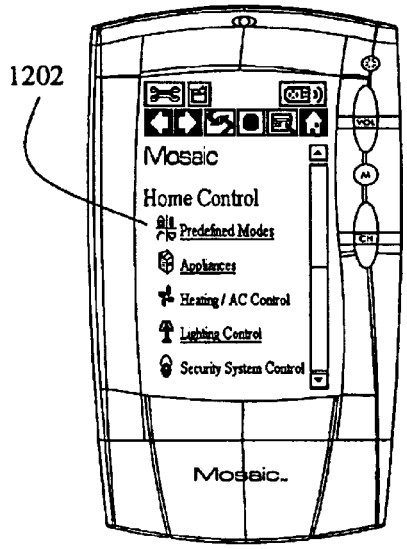

```
<!DOCTYPE HTML PUBLIC "-//W3C//DTD HTML 4.0 Transitional//EN">
<HTML><HEAD><TITLE>Home Manager</TITLE>
<META content="text/html; charset=windows-1252" http-equiv=Content-Type>
<META content="MSHTML 5.00.3207.2500" name=GENERATOR></HEAD>
<BODY leftMargin=0 link=#000000 text=#000000 topMargin=0 #000000?
marginheight="0" marginwidth="0"><A
href="index.htm"><IMG border=0 height=30
src="index_files/mosaic.gif" width=62></A> <BR><FONT
size=+2>Home Control</FONT>(tm)
<TABLE border=0 cellSpacing=1>
 <TBODY>
 <TR>
  <TD width=10>
  <TD><A href="modes.htm"><IMG border=0
   height=25 src="index_files/modes.gif" width=25></A> </TD>
  <TD><A href="modes.htm">Predefined Modes</A>
  </TD></TR>
 <TR>
  <TD width=10>
  <TD><A href="appliances.htm"><IMG border=0
   height=25 src="index_files/Appliances.gif" width=25></A> </TD>
  <TD><A href="appliances.htm">Appliances</A>
  </TD></TR>
 <TR>
  <TD width=10>
  <TD><A href="hvac.htm"><IMG border=0
   height=25 src="index_files/hvac.gif" width=25></A> </TD>
  <TD>Heating / AC
   Control</TD></TR>
 <TR>
  <TD width=10>
  <TD><A href="lighting.htm"><IMG border=0
   height=25 src="index_files/lighting.gif" width=25></A> </TD>
  <TD><A href="lighting.htm">Lighting
   Control</A> </TD></TR>
 <TR>
  <TD width=10>
  <TD><A href="security.htm"><IMG border=0
   height=25 src="index_files/Security.gif" width=25></A> </TD>
  <TD>Security System
   Control</TD></TR></TBODY></TABLE></BODY></HTML>
```

Figure 12

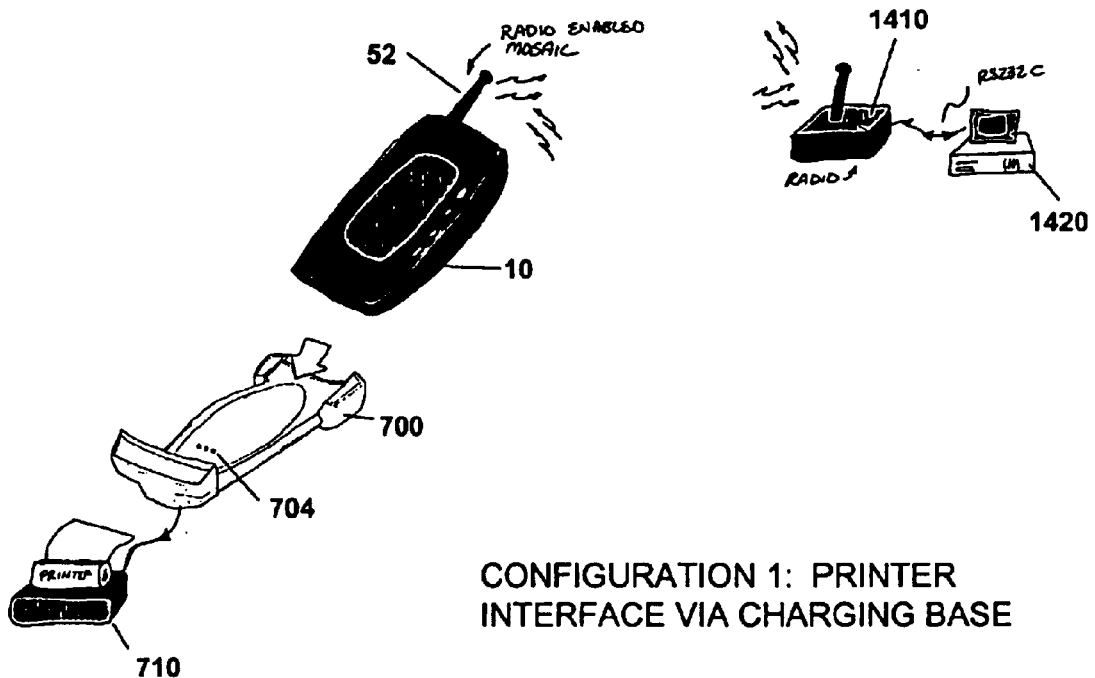
CONFIGURATION 1: PRINTER INTERFACE VIA CHARGING BASE
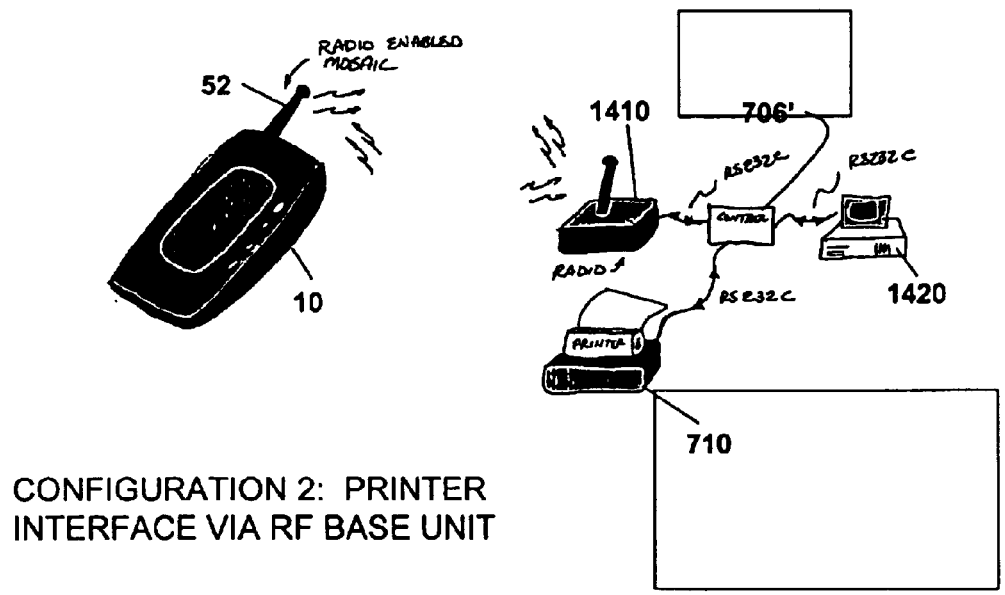
CONFIGURATION 2: PRINTER INTERFACE VIA RF BASE UNIT
FIGURE 23

Printer output data routing in Remote Control

Printer data routing in RF base station

UNIVERSAL REMOTE CONTROL WITH DISPLAY AND PRINTER

CROSS REFERENCE TO RELATE APPLICATIONS

This application claims the benefit of U.S. Provisional Application Ser. No. 60/288,192, filed May 2, 2001, which is incorporated herein by reference.

BACKGROUND OF THE INVENTION

This invention relates generally to remote controls and consumer electronics, and, more particularly, relates to printer devices.

Consumer devices continue to become more complex, and for many consumers, more difficult to fully understand and operate. The first consumer electronic devices, radios and, later, televisions, had no remote controls. The controls then were simple—a combination power switch and volume control and a tuning control. With the advent of the remote control, new features were added—one of the first being the volume "Mute" feature. Soon, it became possible to perform many functions on the TV or the radio (now part of a larger system of amplifier, pre-amplifier, tuner and speakers).

New, and eventually popular, consumer electronic devices were later introduced, including the VCR, CD player and more recently, the DVD player and PVR (personal video recorder). The VCR was initially introduced without a remote control, but quickly remote controls were added to the product offering. Early VCR remote controls simply controlled the power and the transport mechanism ("Play," "Stop," "Pause," "Rewind," "Fast Forward" and "Record"). Today, VCR remote controls have far more features. For example, they permit the adjustment of tape tracking, the selection of programs for future recording, direct channel access, frame-by-frame program viewing and the ability to set the VCR's clock. To this end, the VCR remote control has grown from seven or eight keys to twenty or more.

The CD player, when first introduced, came with a remote control. The first CD players held a single disk and were easy to control. Today, a consumer can buy a CD player that holds two hundred or more disks. This CD "jukebox" permits the consumer to painstakingly enter the title of each disk by remote control, and control which disk and track of that disk will play next. This remote control has also grown from ten keys or so to over thirty with many keys performing two or more functions.

Not only have the devices and their remote controls become more complex, but there are now many more devices that consumers are adding to their family room. Around the time of the Great Depression, the family would sit around the radio, the only electronic entertainment device of its time. Television was introduced in the 1950s and by the 1960s, many homes had one. VCRs were introduced in the 1970s. Today virtually every home has at least one TV and VCR. CD players were introduced in the 1980s and DVD players and digital satellite systems were introduced more recently in the late 1990s. All of these devices, and many more, now arrive in the home with a remote control.

It has become far more complex than ever before to simply turn the electronic family entertainment system on. While for some families the TV can still be turned on with the press of one key on the TV remote control, for other families, the pre-amplifier, amplifier and cable or satellite have to be turned on, too. To watch a rental movie, the VCR or DVD player has to be turned on. Finally, all these devices have to be controlled —volume set, the "Play" mode activated, the TV tuned to the right channel, and so on. So, rather than maintain a plethora of remote controls on the coffee table, consumers turned to universal remote controls or larger control systems which consolidated many, if not all, of the remote controls in the home into one, more easily used device.

Universal remote controls available today perform a valuable function, consolidating three, four, five and more remote controls into one device. Typically, the universal remote control simplifies operation by reducing the number of keys, and therefore, the number of features available to the consumer. With the same number of keys as found on one TV or VCR remote control, the universal remote control can operate the basic functions of several devices. For many consumers, the basic functions are enough for day-to-day use.

For consumers with a more complex entertainment system or for those desiring control over a larger range of functions, extensive consumer electronic control systems are available. These systems can be configured to control the family entertainment system, the home alarm system, heating and air conditioning, lights and the drapes. These systems put the consumer in intimate contact with all possible electronic and electrical functions of the home.

For companies that provide remote controls, consumer electronic devices continue their march toward even greater complexity. A new wave of devices are in development now and include, among others, digital TV, personal digital assistants with two-way communications and products that converge the TV and the PC. Thus, a new form of easy-to-use remote control will be required to meet the needs of consumers as these new devices are integrated into the home. In addition, to appeal to the largest number of consumers, this new form of remote control must be inexpensive. Furthermore, to accommodate the continuing growth in complexity of consumer electronic devices, this new form of remote control must possess new features and include the ability to stay flexible.

SUMMARY OF THE INVENTION

In accordance with these needs, a remote control comprising print capability is provided. For some applications the remote control functions as an interface between a consumer electronic device and a printer.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which:

FIG. 12 illustrates an exemplary browser-based home control screen displayed on the universal remote control of FIG. 1 and the HTML source for use in displaying the control screen;

FIG. 23 illustrates two system configurations for interfacing with a printer, namely via a physical connection and via a wireless connection;

DETAILED DESCRIPTION

Figure 1:
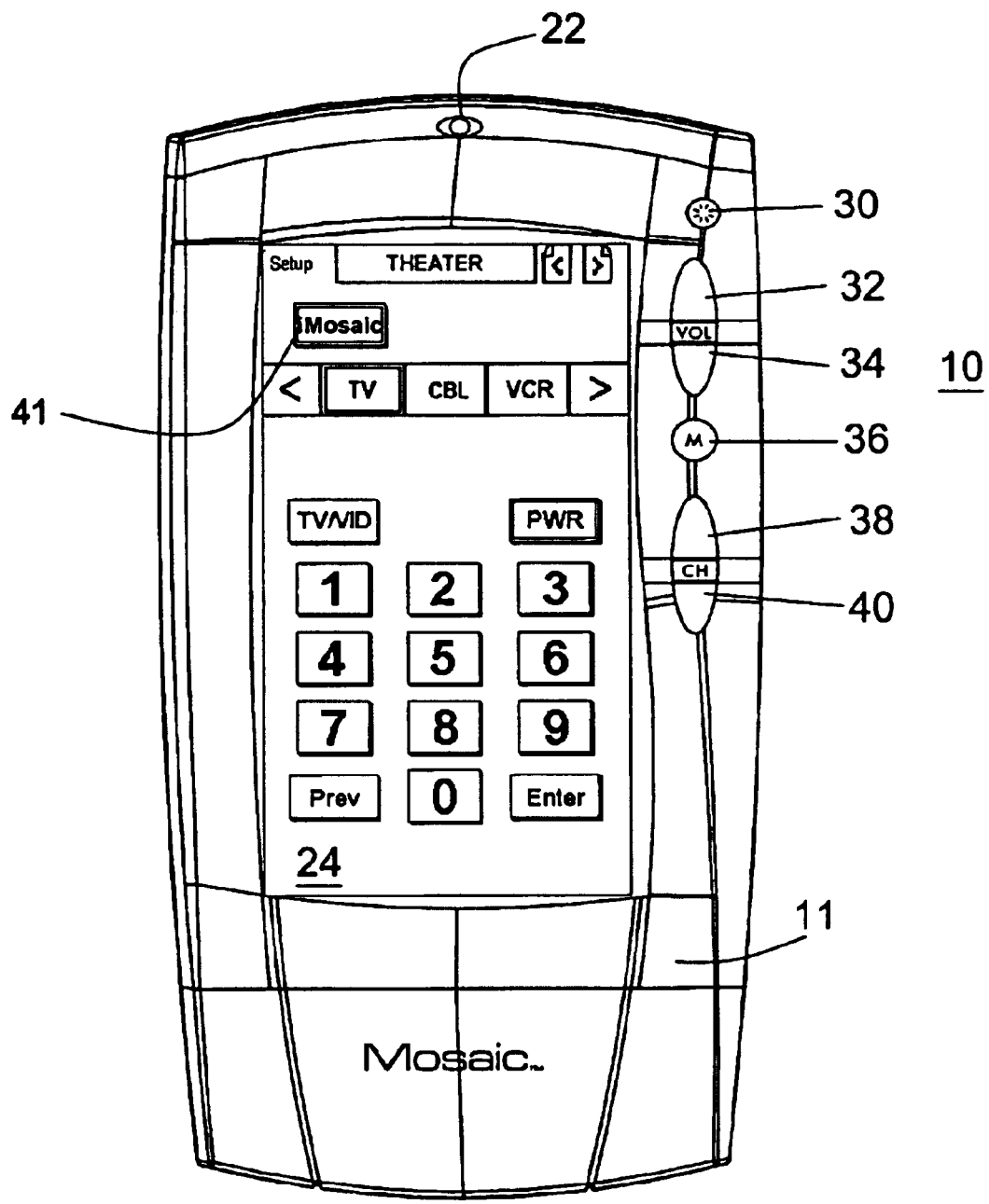
FIG. 1 illustrates a pictorial drawing of a universal remote control in which the principles of the subject invention may be embodied.
Figure 2:
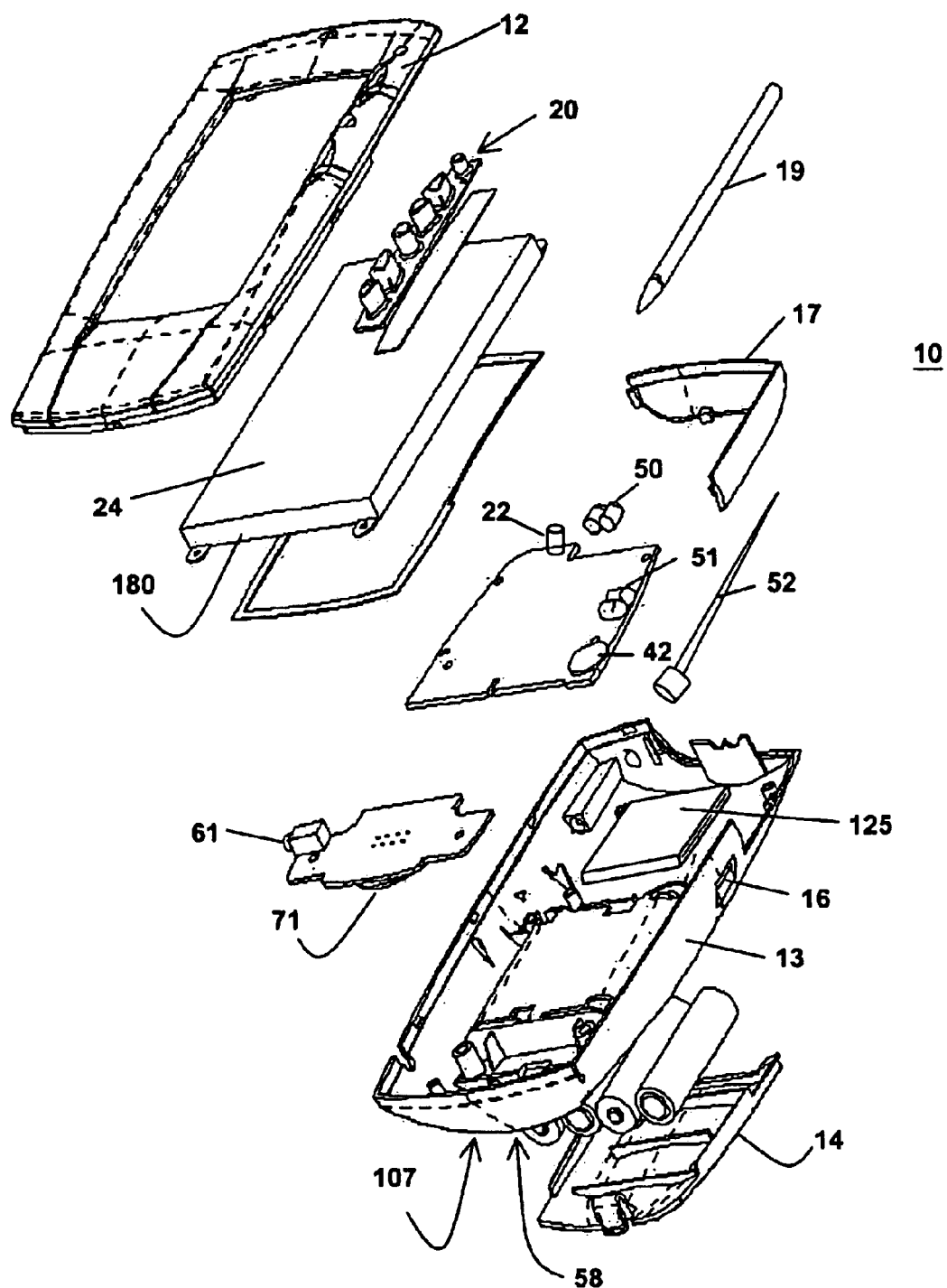
FIG. 2 illustrates an exploded assembly drawing of the universal remote control illustrated in FIG. 1.

Referring now to FIGS. 1 and 2, there is illustrated a universal remote control device 10 in which the teachings of the present invention may be embodied. The remote control 10 comprises a housing 11, itself comprising two parts, an upper housing 12 and a lower housing 13. Included in the lower housing 12 is a battery cover 14, a stylus repository, and a slot 16 through which a liquid crystal display (LCD) contrast control switch 42 may be accessed. Stylus 19 may be located in the stylus repository.

The upper housing 12 has openings through which keys 20, red light emitting diode (LED) 22 and a LCD 24 with a translucent touch sensitive overlay can be accessed. The keys 20 are illustrated as being arranged in a vertical line to the right of the LCD 24 and may comprise (from top to bottom) a "Backlight" key 30, "Volume Up" and "Volume Down" keys 32 and 34, "Mute" key 36, and "Channel Up" and "Channel Down" keys 38 and 40, respectively. The "Contrast Control" switch 42 can be located on the right side of the remote control 10 below the "Volume Up" and "Volume Down" keys, 38 and 40. The upper housing 12 may also include an opening for voice access to a microphone.

At the top or forward end of the remote control 10, there is illustrated an opening for two forward facing infrared LEDs 50 and two side facing LEDs 51. While the LEDs are provided for transmitting command signals to consumer devices, the forward facing LEDs 50 may also perform as an infrared light detector according to the teachings of co-pending U.S. patent application Ser. No. 09/080,125 which is incorporated herein by reference in its entirety. The opening in which the LEDs 50 and 51 are carried may be covered by an infrared-transparent lens 17. The forward end of the remote control 10 may also include an opening for an RF antenna 52. On the underneath portion of the remote control 10 are located openings for a battery compartment 58 and, optionally, a piezo speaker, and/or connection contacts, e.g., battery charging contacts 107. On the left side of the remote control 10 can be placed a phone jack 61 reserved for serial data operations. In certain embodiments, a magnetic modem coupler 71, as described in U.S. Pat. No. 5,537,463 which is incorporated herein by reference in its entirety, can be included to permit transfer of data into the unit via a telephone handset or other source of magnetically encoded signal such as television or P.C. loudspeakers Referring now to FIG. 3, there is illustrated a block diagram of exemplary operating circuitry 100 of the remote control 10. The operating circuitry 100 may be powered directly by a battery or indirectly from another electrical source. For example, power may be supplied by way of contacts 107, which may for example be battery charging contacts, or by other power sources (preferably a dc power source). The power supply is regulated and monitored by a power conditioning and status circuit 106 which includes provision for recharging the batteries (when the unit is equipped with rechargeable cells) via a set of external contacts 107. The operating circuitry 100 preferably includes a memory bank 110 comprising RAM 111 and Flash memory 112, Main Processor 101 (e.g., a Sharp LU77790A), a Display Module 180 comprising a liquid crystal display glass 182, touch panel overlay 184, electroluminescent backlight 186 and drivers 188.

Also included in the operating circuitry 100 are shown a General Purpose Serial I/O circuit 108, an Infrared Controller 140 (e.g, comprising a Samsung KS88C01424 Microcontroller), an Infrared Transmitter circuit 150, an Infrared Receiver circuit 160, a Analog-to-Digital Converter (ADC) and Touch Decoder Circuit 170 (e.g., comprising a PIC16LC715 Microcontroller or other touch screen controller/decoder chip), a Piezo Buzzer 102, a Key Pad 190 (the electrical diagram equivalent of the elastomeric keyboard 20 shown in FIG. 2), a magnetic modem 71, and an RF Module 152 comprising an RF Controller 120 (e.g., a PIC16F84 Microcontroller) and an RF Transceiver 130 (e.g., an RF Microdevices RF2915 chip). In an alternative embodiment, this RF module 125 may comprise an "off-the-shelf" RF transceiver unit with integral baseband processor such as the "900 MHz Microhopper" available from World Wireless Communications Inc. as part number 011-1882. It will be appreciated that RF modules of other manufacture and/or other technologies (Bluetooth, IEE802.11, etc.) are equally suitable. The RF circuitry is connected to the RF antenna 52 while the IR circuitry is connected to the IR LEDs 50 and 51.

The Main Processor (e.g., a Sharp "System on a Chip," the LU77790A) may be based on a 32-bit, ARM RISC (Reduced Instruction Set Computer) core. In this regard, the Main Processor would comprise the ARM processor core 300, LCD controller 310, general purpose I/O ports 320, and multiple serial UART ports 330. The Main Processor is provided to manage the entire process of interacting with the user through the backlit, graphical, touchscreen, LCD module 180, the piezo buzzer 102, the key pad 190, the microphone and/or the red LED 235 (LED 22 of FIGS. 1 and 2) and to provide two-way infrared and RF communications through the infrared controller 140 and the RF controller 120.

Figure 3:
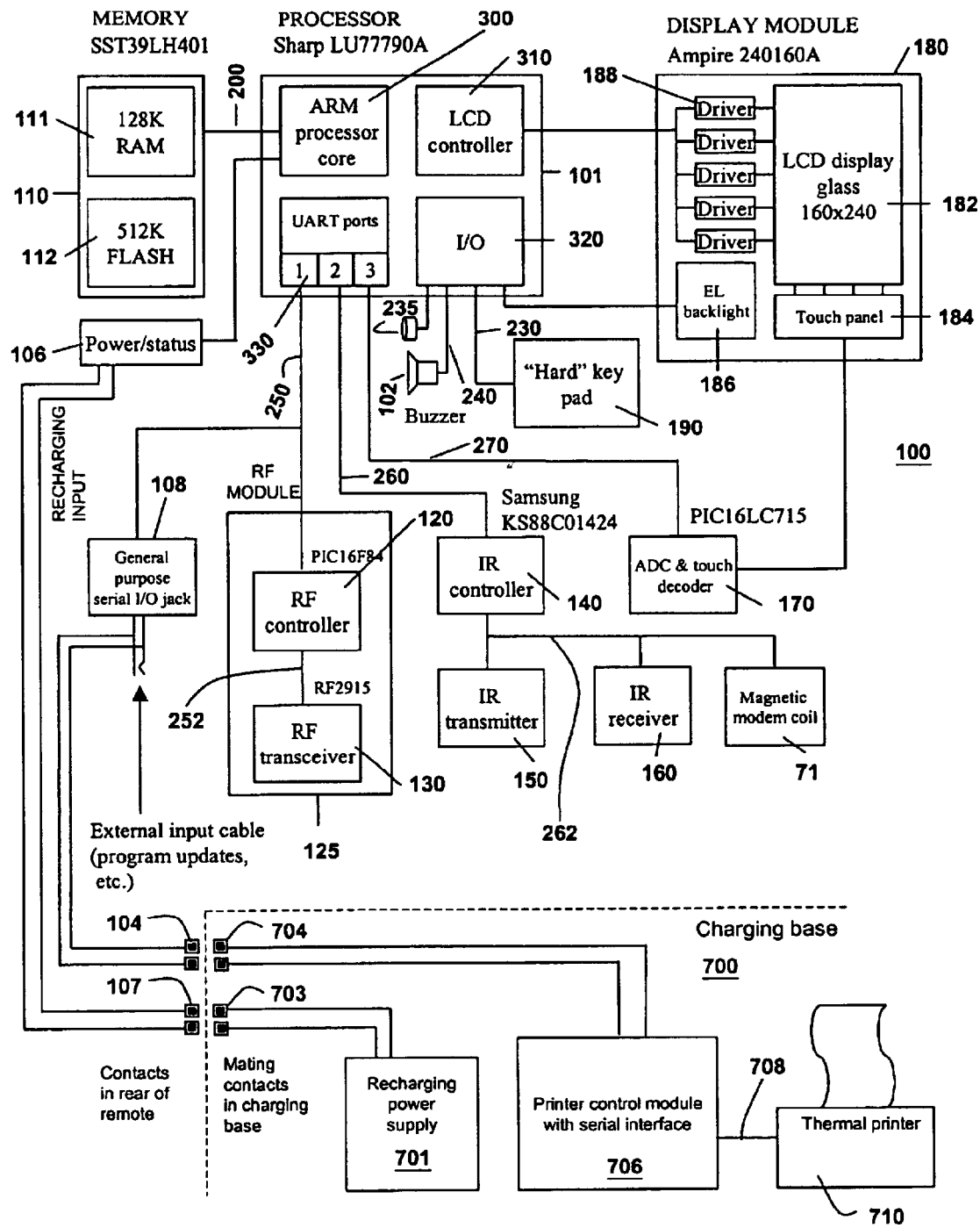
FIG. 3 illustrates a block diagram of exemplary hardware for use in connection with the universal remote control illustrated in FIG. 1.

FIG. 3 further illustrates the electrical connections between the various modules such as connection 200 interconnecting the memory module 110 with the Main Processor 101, connections 210 and 220 interconnecting the LCD 180 with the Main Processor 101, connections 230, 240, 250, 260, and 270 interconnecting the Main Processor 101 with the Key Pad 190, Piezo Buzzer 102, the General Purpose Serial I/O Circuit 108 and the RF Controller 120, Infrared Controller 140, and ADC and Touch Decoder Circuit 170, respectively. Other connections include the connection 252 between the RF Controller 120 and the RF Transceiver 130 and connection 262 interconnecting the Infrared Controller 140 with the Infrared Transmitter 150 and also connecting the Infrared Controller 140 with the Infrared Receiver 160.

FIG. 3 also shows that the remote control 10 can be adapted to mate to a charging base 700 to receive power and/or communications. To this end, the remote control may include recharging contacts 107 and data contacts 104. The contacts 107 and 104 are provided to electrically couple with corresponding contacts 703 and 704 in the charging base 700. The exemplary charging base 700 depicted in FIG. 3 may therefore comprise a power source 701 such as, for example, stepped-down power originating from a household electrical socket, which is connected to contacts 703. The exemplary charging base 700 may also comprise a printer control module 706 that preferable comprises a serial interface (though other types of connection are acceptable) to connect, via connection 708, to a printer 710 and, via contacts 704, to the remote control 10. For some applications the printer 710 is a thermal printer integrated into the charging base 700. The print control module 706 may alternatively be incorporated into the operating circuitry 100 of the remote control 10 or it may be incorporated into the printer 710. Either of the later alternatives allow the printer 710 to be connected directly to the remote control 10. Any of the foregoing configurations allows the remote control 10 to function as a link, or interface, between a consumer electronic device (e.g., PC, home gateway, keyboard, TV, etc.) and the printer 710.

FIG. 23 illustrates two configurations for interfacing with a printer. Configuration 1 is representative of the above-described system configuration where the remote control 10 interfaces with the printer 710 via a physical connection. Configuration 2 is representative of a wireless interface where the data is sent through printer control module 706' (which is associated with a base station).

The electronic configuration illustrated in the block diagram of the operating circuitry 100 comprises a general purpose, multi-processor system. The operation of the multi-processor system is controlled by internal control software. The control software may include routines, programs, objects, components, and/or data structures that perform particular tasks that can be viewed as an operating system together with one or more applications. The operating system provides an underlying set of management and control functions which are utilized by the applications to offer user functions such as control of consumer appliances, access to Internet data, display of home automation controls, display of TV guide information, and the like. It should be understood that, while the term "remote control" is used herein to designate the physical unit, in terms of the internal software architecture the conventional "clicker" remote control user interface is but one of several possible applications which may co-exist within the unit.

Architecturally, the system is organized around the concept of Events and Resources. Events are occurrences which initiate an action. More specifically, an Event is an occurrence that requires a response from the remote control 10. Events include user-initiated activities such as pressing a physical key on the keypad 20, activating the touch screen LCD 24, speaking into a microphone, etc. Events can also be generated by the Main Processor 101, for example by an internal timer register. In addition, Events can be generated by external means, such as, a communication transmission, etc.

In response to an Event, the remote control will typically access one or more of its Resources. A Resource is, in its broadest definition, a block of data. The data is often of a specific (defined) type. Within the memory 110, each memory data block is preferably identified by its "Resource ID" or by another indication where the Resource is located in the final, complete memory structure. Examples of Resources are bitmaps, strings, and control and display definitions. Generally, Resources are used to configure the remote control 10 to be responsive to the needs of the user. Many Resources are loaded into the memory 110 of the remote control 10 by the manufacturer when the remote control 10 is built. Other Resources may be created or modified by the user and still other Resources can be remotely loaded into the memory 110 by a service center, via the Internet, etc. Resources allow the behavior, look and feel of the remote control 10 to be altered, even after it has been sold and is in the hands of the user. This powerful concept permits the user to personalize the remote control 10 to his or her own tastes.

For ease of development, Resources may be instantiated within the remote control 10 by use of a Resource Compiler running on a PC or equivalent. The Resource Compiler accepts a text description of graphic and control elements and compiles them into memory data structures suitable for use within the remote control 10. Although other mechanisms, e.g., manual compilation, self generation by the remote control operating system under user control, etc., are possible, a PC based Resource Compiler may provide the most efficient method for rapid development of Resources needed for a particular remote control application. Examples of commands which are available in an exemplary Resource Compiler for use in generating the memory data structures for the remote control include:

SYMBOL (SymbolName, Expression)

"SymbolName" is the name of a new symbol to be created. "Expression" is an algebraic expression. It may also comprise previously defined expressions.

INCLUDE (FilePath)

"FilePath" points to a Resource residing in disk storage that will be included in the final memory data structure of the remote control.

BITMAP (BitMapName, BitsPerPixel, Width, Height, Radix)

The BITMAP command generates a black and white bitmap Resource. "BitMapName" is the bitmap Resource ID while the "Width" and "Height" size the bitmap. "BitsPerPixel" is set to '1' and "Radix" is set to '2' in the first generation of the remote control product.

FONT (FontName, StartAsciiIndex, EndAsciiIndex)

FONT generates a Resource Table that associates numeric values with bitmaps. This approach permits the use of an unordered set of bitmaps to be used as alphabetic characters or font. "FontName" is a SYMBOL. Its assigned value is the Resource ID of the font. "StartAsciiIndex" is the index value associated with the first bitmap ID. "EndAsciiIndex" is the index value associated with the last bitmap ID. A list of bitmap Ids follows this Command. The bitmap IDs are typically expressions in the form of SYMBOL names.

STRING (StringName, StringCharacters)

STRING generates a String Resource. "StringName" is a SYMBOL. Its assigned value is the String Resource ID. "StringCharacters" comprise the text in the string.

DATA (DataName, [DataSpecifier,[Expr]],DataEnd)

DATA generates a Data Resource. "DataName" is a SYMBOL. Its assigned value is the Data Resource ID. "DataSpecifier" indicates the size of the expressions ("Expr") that follow it. There can be multiple expressions following a DataSpecifier and there can be multiple DataSpecifiers in a Data Resource.

BITMAPBUTTONCONTROL (ControlName, ControlCode, UpBitMapID, DownBitMapID, InactiveBitMapID, SelectBitMapID)

BITMAPBUTTONCONTROL generates a bitmap push button control.

"ControlName" is a SYMBOL. Its assigned value is the Resource ID for the control. "ControlCode" is the value generated when the control on the touchscreen display is pressed or released. "UpBitMapID" is the Resource ID of the bitmap that is drawn on the display when the control is active but not pressed. "DownBitMapID" is the Resource ID of the bitmap that is drawn on the display when the control is active and pressed by the user. "InactiveBitMapID" is the Resource ID of the bitmap that is drawn on the display when the control is inactive. "SelectedBitMapID" is the Resource ID of the bitmap that is drawn on the display when the control is active and visually highlighted.

STRINGBITMAPCONTROL (ControlName, ControlCode, StringID, FontID, UpBitMapID, DownBitMapID)

STRINGBITMAPCONTROL generates a bitmap push button control on the display with a string drawn over it. "ControlName" is a SYMBOL. Its assigned value is the Resource ID for the control. "ControlCode" is the value generated when the control on the touchscreen is pressed or released. "StringID" is the Resource ID of the string that is drawn when the control is pressed or unpressed. "FontID" is the Resource ID of the font with which the string is drawn. "UpBitMapID" is the ResourceID of the bitmap that is drawn on the display when the control is active but not pressed. "DownBitMapID" is the Resource ID of the bitmap that is drawn on the display when the control is active and pressed by the user.

COMPOSITECONTROL (ControlName, TopX, TopY, ControlCode, Parameters [below], End)

Rect: Xoffset, Yoffset, Width, Height, ForeGroundColor, BackGroundColor

BitMap: BitMapID, Xoffset, Yoffset, XferMethod

Line: X1offset, Y1offset, X2offset, Y2offset

RoundRect: Xoffset, Yoffset, Width, Height, Radius, ForeGroundColor, BackGroundColor Text: StringID, Xoffset, Yoffset, Spacing, ForeGroundColor, BackGroundColor, Direction, FontID ClipRect: Xoffset, Yoffset, Width, Height COMPOSITECONTROL generates a bitmap control for display from a collection of drawing primitives. The control may be used as a picture or as a pushbutton control. Unlike other controls just mentioned, this control does not change when pressed. "ControlName" is a SYMBOL. Its assigned value is the Resource ID for the control. "TopX" is the left coordinate of the control. "TopY" is the top coordinate of the control. "ControlCode" is the value generated when the control on the touchscreen display is pressed or released. The parameters are optional graphic commands. They are:

'Rect' defines an unfilled rectangle. Xoffset and Yoffset are the distance from TopX and TopY at which the top left coordinate of the rectangle is located. Width an Height are the dimensions of the rectangle. ForeGroundColor is the color of the rectangle and BackGroundColor is the color behind the text.

'BitMap' defines a bitmap and its location. BitMapID is the Resource ID of the bitmap. Xoffset and Yoffset are the distance from TopX and TopY at which the top left coordinate of the bitmap is located. The XferMethod determines how the bits in the bitmap will be applied.

'Line' draws a line from X1offset, Y1offset to X2offset, Y2offset. X1offset and Y1offset are the distance from TopX and TopY at which point the line begins. X2offset and Y2offset are the distance from TopX and TopY at which point the line ends.

'RoundRect' defines a rectangle with rounded corners. Xoffset and Yoffset are the distance from TopX and TopY at which the top left coordinate of the rectangle is located. Width an Height are the dimensions of the rectangle. Radius is the radius of the rounded corners. ForeGroundColor is the color of the rectangle and BackGroundColor is the color behind the text.

'Text' places a text string on the display. StringID is the Resource ID of the text to be drawn on the display. Xoffset and Yoffset are the distance from TopX and TopY at which the top left coordinate of the string is located. Spacing is the number of blank bits between letters. ForeGroundColor is the color of the text and BackGroundColor is the color behind the text. Direction specifies the direction at which the text will be drawn. The FontID is the Resource ID for the font to be used in representing the text.

'ClipRect' defines an allowable area within the display within which a drawing may appear. Xoffset and Yoffset are the distance from TopX and TopY at which the top left coordinate of the drawing area is located. Width an Height are the dimensions of the drawing area.

SCROLLCONTROL (ControlName, ControlCode, Left, Top, Right, Bottom, State, TopUpID, TopDownID, BottomUpID, BottomDownID)

SCROLLCONTROL generates a bitmap control which displays a vertical scroll bar with top and bottom arrows. "ControlName" is a SYMBOL. Its assigned value is the Resource ID for the control. "ControlCode" is the value generated when the control on the touchscreen is pressed or released. "Left" is the left most X coordinate of the displayed control. "Top" is the upper most Y coordinate of the displayed control. "Right" is the right most X coordinate of the displayed control. "Bottom" is the lower most Y coordinate of the displayed control. "State" is the default settings for the state flags. "TopUpID" is the Resource ID of the top arrow bitmap that is drawn on the display when the control is active but not pressed. "TopDownID" is the Resource ID of the top arrow bitmap that is drawn on the display when the control is active and pressed by the user. "BottomUpID" is the Resource ID of the bottom arrow bitmap that is drawn on the display when the control is active but not pressed. "BottomDownID" is the Resource ID of the bottom arrow bitmap that is drawn on the display when the control is active and pressed by the user.

TEXTBOXRESOURCE (ControlName, ControlCode, Width, Height, Left, Top, Right, Bottom, ScrollID, StringID, FontID, Box, Type, Radius)

TEXTBOXRESOURCE generates an allowable area on the display for text and an optional scrollbar and fills the area with scrollable text. "ControlName" is a SYMBOL. Its assigned value is the Resource ID for the control. "ControlCode" is the value generated when the control on the touchscreen is pressed or released. "Width" and "Height" are the dimensions of the text box, including the scroll bar. "Left" is the left most X coordinate of the displayed control. "Top" is the upper most Y coordinate of the displayed control. "Right" is the right most X coordinate of the displayed control. "Bottom" is the lower most Y coordinate of the displayed control. "ScrollID" is the Resource ID of the scroll control used in the text box. "StringID" is the Resource ID of the string that is drawn when the display is first shown. "FontID" is the Resource ID of the font with which the string is drawn. "BoxID" specifies that the box will not be drawn or will be drawn with square or rounded corners. If rounded corners are specified, "Radius" defines the radius of the rounded corners.

Figure 4:
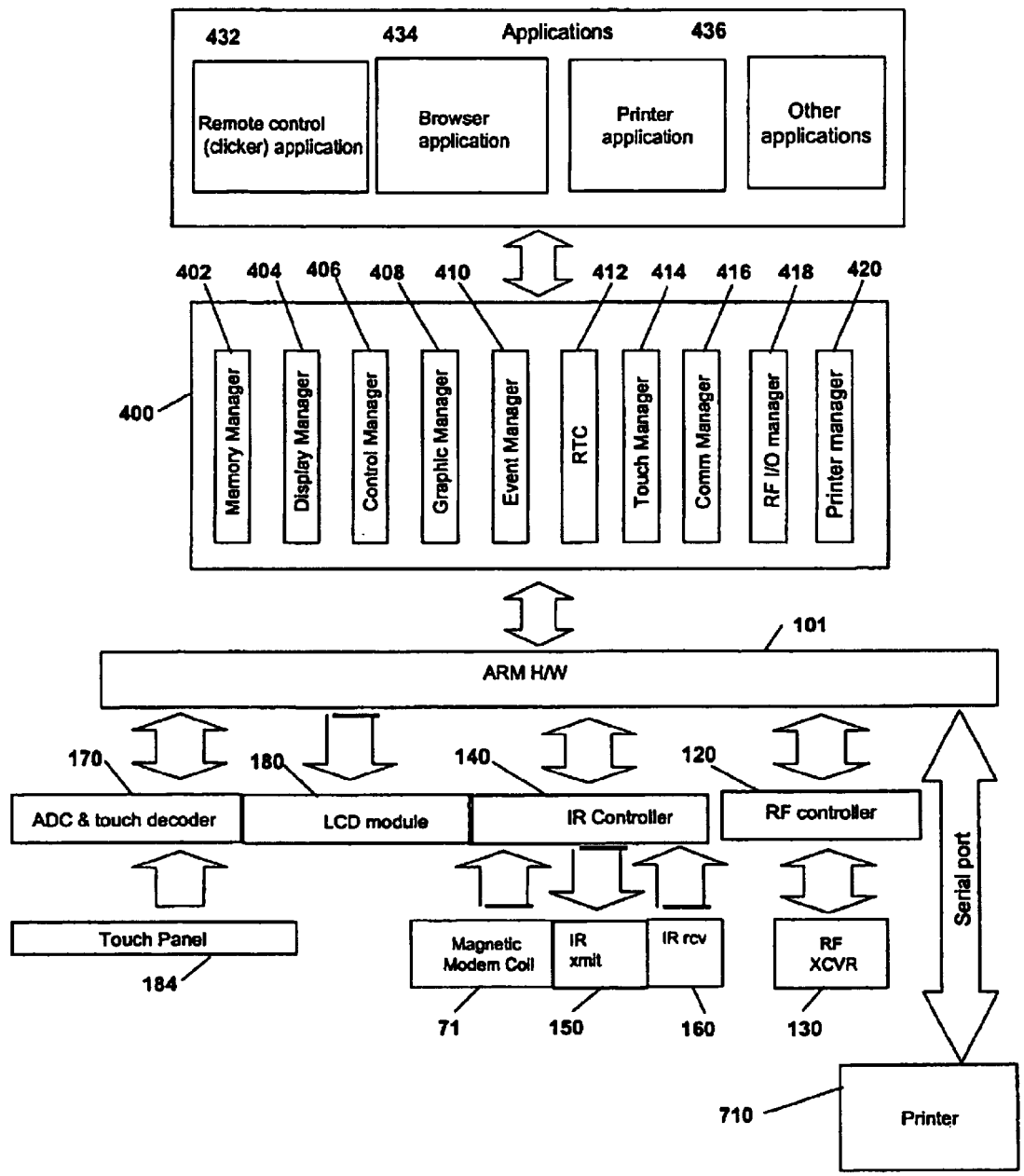
FIG. 4 illustrates an exemplary operating system and hardware hierarchy for use in the universal remote control illustrated in FIG. 1.

Turning to FIG. 4, the Operating System (OS) 400 software that the Main Processor 101 executes is organized into several units called Managers. Each Manager performs a specific task when called upon by the OS 400. The following are exemplary Managers:

The Memory Manager 402 allocates blocks of memory and resources for use by an application program 434.

The Display Manager 404 controls what is shown on the LCD (180 in FIG. 3). It can control what is shown over the entire LCD or just a portion of it. The Display Manager 404 generates a display based primarily on specified Resources held in memory. The display can, therefore, be modified by changing the content of the Resource rather than by changing the Display Manager code 404.

The Control Manager 406 creates and destroys controls as well as handles the user responses to the interactive graphical controls displayed on the LCD. When a user selects a graphical icon shown on the LCD, the Control Manager 406 responds to the Event and may alter the graphical display in response to the user action. All icons and graphical entities displayed by the Control Manager 406 originate as a Resource and may, therefore, be changed.

The Graphic Manager 408 is responsible for the actual drawing of the entities shown on the display. It also loads the alphabetic fonts used for text in the display.

The Event Manager 410 will queue or mask events that arise during the operation of the remote control 10. These events include user interaction with the touch screen 24 or key pad 20 and system events generated by timers or by any of the communication ports. Events in the queue are accessed by Application Software 434.

The real-time clock (RTC) Manager 412 generates a periodic timing mark as an Event. It also keeps the current time.

The Touch Manager 414 generates an Event each time the touch screen 24 is touched and sends the event to the event manager 410.

The Communication Manager 416 handles all serial messages between the Applications 430 or other Operating System software modules and those peripherals connected on the serial buses such as the Infrared Controller 140, and the ADC and Touch Decoder 170.

The RF I/O manager 418 handles all two-way data communication between Applications 430 and remote resources such as server applications running in other devices (PCs, set top boxes, TV sets, CD jukeboxes, etc.).

The Printer Manager 420 coordinates communication between the remote control 10 and the printer 710, as well as, in some applications, between a consumer electronic device and the printer 710. Devices can send information to the remote control 10 (or the remote control 10 can retrieve information) during the normal course of using the system. Data transfers can happen automatically or by user request. In some applications the data is stored within memory, e.g., memory 110, until the remote control 10 is subsequently docked in the charging base 700. Data can then be printed out either automatically or by user request. The Printer Manager 420, for example, may either alone or in conjunction with another manager, e.g., the Display Manager 404, present the user with a menu of stored items for which he could select those desired to be printed out.

To communicate to systems beyond those devices conventionally found in a home entertainment system, the remote control 10 provides a two-way infrared or two-way RF system (or other communication technology). Using this communication technology, the remote control 10 can access, process, and/or display data from remote sources. The RF I/O manager 418 (or IR I/O manager in the event a two-way IR communications path is used instead) accepts data from Applications 430 running under the OS and prepares the data for communication by splitting the data into packets and adding packet header information. It also accepts received packets, ensures packet integrity and assembles the received packets into data to be sent to the Application(s) 430.

The RF I/O manager 418 interacts directly with the two-way RF hardware previously described (e.g., RF Controller 120 and RF Transceiver 130). Checksums are appended to outbound data and the packets are sent. Inbound data is received from the communications hardware. Error free packets are passed to the Application interface and a confirmation of successful reception is sent to the originator. Packets with errors are discarded and up to three retransmit requests can be sent to the originator.

In one preferred embodiment, the data communication protocol implemented by the RF I/O Manager 418 comprises communication packets which can carry data or commands. Each packet comprises a header and the attached command or data. Commands are transfers of non-data. They are acted upon, not stored. A sequence is any number of packets that comprises an entire transfer of data, such as a complete text stream, a complete bitmap file, a Web page or any other complete data resource. A block is a series of data packets whose number does not exceed 128. A single block or multiple blocks may constitute a sequence. The Communication Packet format is illustrated in Table 1 below.

TABLE 1

| Field | Bytes | Description |
| --- | --- | --- |
| Byte Count | 1 | Total number of bytes supplied to the end of the data (7 + n) |
| To Address | 2 | The address of the receiving station (usually the server). |
| From Address | 2 | The address of the Remote Control platform |
| Packet Number | 1 | Bits 0–6 are used to be sure every packet is sequential. Most significant bit used to indicate a command packet (MSB set). |
| Port Number | 1 | Used to keep track of multiple data streams. |
| Data | n | Packet payload - data or command |

The Byte Count is the total number of bytes in the packet, including the header. The To Address is the address of the receiving station (usually a server or gateway). The From Address is the address of the remote control 10. The Packet Number is used to ensure every packet is sequential. The Most Significant Bit of the Packet Number indicates a command packet when set to a Logic 1. A unique Port Number can be assigned to each unique data sequence, so that packets of different sequences can be transmitted in an interleaved fashion. Each separate stream of data packets should have its own port number as well as its own packet number sequence.

In one embodiment, six commands are defined for use by the remote control 10. The payload data of each command comprises a one byte command code followed by a variable number of parameters, as:

STX (data=0x02h). The STX command indicates the start of the transmission of a series of packets comprising a data sequence. This command is accompanied by parameters which specify the total number of packets in the sequence and the Port Number assigned to the sequence. Once an STX command is answered by an ACK, any communication using the specified Port Number will be associated with that specific "sequence" of data.

ETX (data=0x03h). The ETX command follows after a complete sequence has been transmitted, and contains the checksum for the entire sequence (excluding the headers). If a NAK is sent as a reply to an ETX command it is meant to signal retransmission of the entire sequence.

ACK (data=0x06h). The ACK command signals a successful transfer of a data Block or Sequence.

NAK (data=0x15h). The NAK command signals an unsuccessful transfer of a data block or sequence. NAK also constitutes a request for retransmission of the data not correctly received.

ETB (data=0x17h). The ETB command indicates the end of a block of data. Also causes the packet sequence count to be reset to zero.

CAN (data=0x18h). The CAN command cancels the sequence on the Port Number included in the data portion of this command.

While the above describes one possible implementation of a communications protocol for transfer of data between the remote control 10 and another device, it will be appreciated that there are many other possible protocols that are equally suitable including, but not limited to, those corresponding to various standards, e.g. Bluetooth, IrDA Control, IEE802.11 and others.

To effect the transmission of IR codes, the IR Controller 140 communicates with applications 430 resident in the remote control 10 using a pre-defined set of commands. Since the actual mechanisms and formats for transmitting such IR signals are well known in the art—see, for example U.S. Pat. No. 4,959,810 which is incorporated herein by reference in its entirety—it will not be described further herein. In an exemplary embodiment, the SendIR command is issued to the IR Controller 140 to cause an IR code to be transmitted. The SendIR command is a six byte packet including the fields RcdLength(1), 01h, DeviceTypeNum (2), KeyCode(1) and KeyFlag(1) where:

RcdLength is a one byte value indicating the total number of bytes in this packet.

01h is a command type which identifies this command as a "send IR" command.

DeviceTypeNum is a combination of DeviceType and DeviceNumber as follows:
Bits 15..12: DeviceType—see Table 2 below.
Bits 11..0: DeviceNumber represents a four (decimal) digit number which identifies a set of IR functions to control a specific device (e.g. "Sony TV set").

KeyCode identifies the function to be transmitted, according to Table 3 below.

KeyFlag indicates if any special processing is required. For example, if KeyFlag bit 7 is "on" this indicates that this IR command is part of a macro sequence playback, requiring that the IR data frame be repeated a certain minimum number of times. If bit 5 is "on" this indicates that the IR Controller should use a learned IR code rather than it's pre-programmed code.

TABLE 2

IR Controller device types

| Device Type | Device Name | Letter Representation |
| --- | --- | --- |
| 0 | TV | T |
| 1 | Cable | C |
| 2 | Video Accessory | N |
| 3 | Satellite/DSS | S |
| 4 | VCR | V |
| 5 | Cassette Tape | K |
| 6 | Laser Disk | L |
| 7 | Digital Audio Tape | J |
| 8 | Digital Video Disk | Y |
| 9 | Tuner/Amplifier | R |
| 10 | Amplifier/Misc. Audio | A/M |
| 11 | Compact Disk | D |
| 12 | Phonograph | P |
| 13 | Home Control | H |
| 15–31 | Reserved | |

TABLE 3

IR Controller KeyCodes

| KeyCode | Function Name |
| --- | --- |
| 1 | Digit 1 |
| 2 | Digit 2 |
| 3 | Digit 3 |
| 4 | Digit 4 |

TABLE 3-continued

IR Controller KeyCodes

| KeyCode | Function Name |
| --- | --- |
| 5 | Digit 5 |
| 6 | Digit 6 |
| 7 | Digit 7 |
| 8 | Digit 8 |
| 9 | Digit 9 |
| 10 | Digit 0 |
| 11 | Volume Up |
| 12 | Volume Down |
| 13 | Mute |
| 14 | Channel Up |
| 15 | Channel Down |
| 16 | Power |
| 17 | Enter |
| 18 | Previous Channel |
| 19 | TV/VIDEO |
| 20 | TV/VCR |
| 21 | A/B |
| 22 | TV/DVD |
| 23 | TV/LD |
| 24 | Input |
| 25 | TV/DSS, TV/SAT |
| 26 | Play |
| 27 | Stop |
| 28 | (Search) Forward |
| 29 | (Search) Reverse |
| 30 | Pause |
| 31 | Record |
| 32 | Menu |
| 33 | Menu Up |
| 34 | Menu Down |
| 35 | Menu Left |
| 36 | Menu Right |
| 37 | Select |
| 38 | Exit |
| 39 ... 255 | Other functions |

It will be appreciated that there are many other commands that go back and forth between the processors and that the above description with respect to the SendIR command is not intended to be limiting.

As previously, the exemplary remote control hardware and operating system are capable of supporting multiple application programs. In a preferred embodiment, two application programs coexist in the unit: one which provides conventional remote control ("clicker") functionality 432, and another associated with the two-way RF communication subsystem which provides general purpose text and graphics display capability in the form of a compact browser utility 434. A printer application 436 may be incorporated with the applications 430 to facilitate printer functionality, as well as communication with a segregated printer, e.g., printer 710. The application which provides conventional consumer appliance remote control functionality is preferably the application that is launched by default upon power-up (i.e., insertion of batteries into the unit) and is the mode of operation to which the user usually returns.

FIG. 1 illustrates a typical appearance of the LCD touch screen 24 when the remote control 10 is in the mode of operation for providing remote control functionality.

It will be appreciated that many other displays are also available, depending on the type, model, and functionality of the device(s) to be controlled. In addition, the remote control application need not display key icons for functions not supported by a particular device, so the actual display may vary according to the specific device brand or even model currently set up. For example, even though the IR Controller and the remote control screen layout may in general support menu operations (see KeyCodes 32 through 38 in Table 1), if the specific device currently set (e.g., a Goldstar TV) does not offer this feature, those keys need not be displayed.

Figure 5:
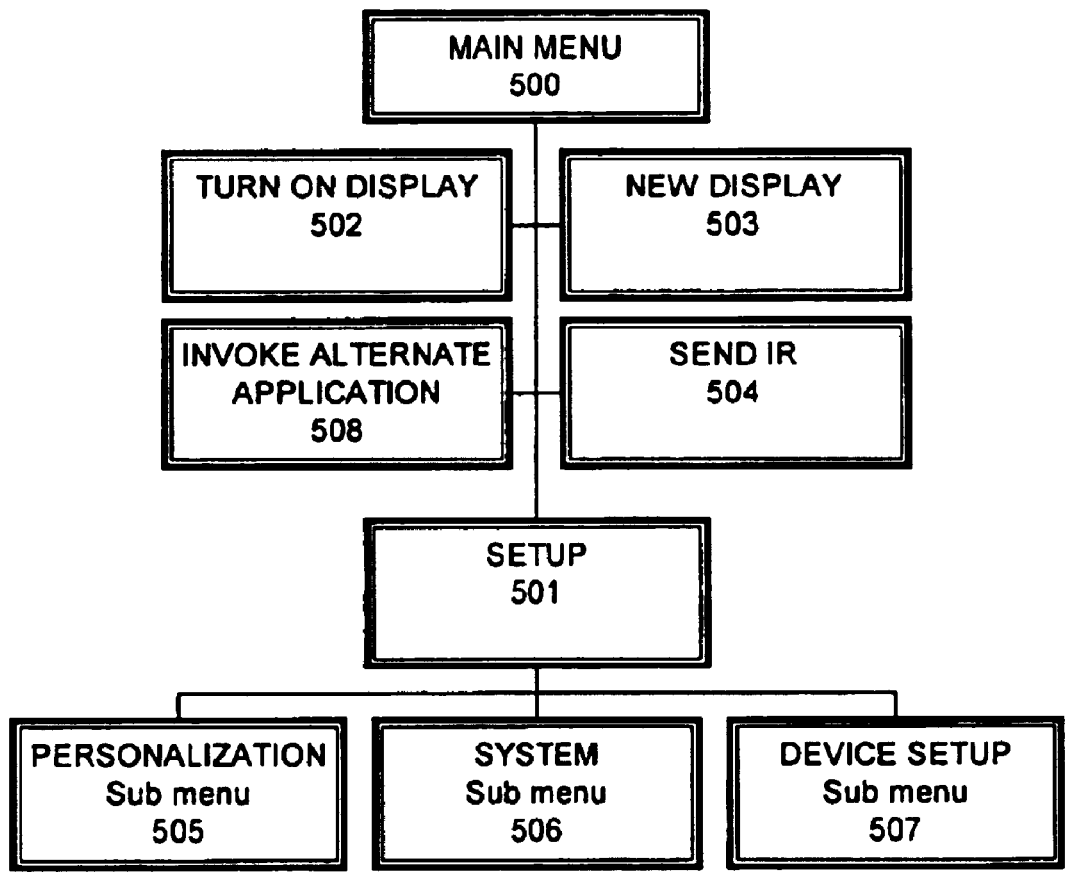
FIG. 5 illustrates an exemplary remote control application program hierarchy for use in the universal remote control illustrated in FIG. 1.

Turning now to FIG. 5, FIG. 5 illustrates the top level program hierarchy within the remote control application 432. The remote control application 432 (and its sub-applications) acquire events from the event queue (placed there by the Event Manager 410) and use other Managers and resources to perform their intended function. The main menu sub-application 500 is called at the time the remote control 10 receives power, for example the time at which the batteries are installed. It initializes all the Managers 400, places a welcome message on the LCD display 24, initializes and loads all applications and resources that may be used. After a set period of time (a few seconds), the welcome message should be replaced by the default device screen. A typical default device screen is shown in FIG. 1.

Once all applications and resources have been initialized, the main menu sub-application 500 waits for an Event. One such Event is an internal main processor timeout which, in this specific case, turns off the display and system CPU to save battery power. Another such Event is a user keypress. In this latter regard, the user may press one of several types of keys, creating Events to which the main menu sub-Application 500 responds. One or more of the control keys shown on the display 24 generates an Event invoking a sub-application 503 that produces a new display. Typically this might be a second "page" (i.e., alternative device screen) of command keys for the current device under control (e.g., a TV) or for a different device (e.g., from TV to VCR) with a new page of keys. Activation of another group of keys (both the "soft" keys shown on the display and the hard keys in the keypad 20) will invoke a sub-application 504 that transmits an infrared code. The send IR sub-application 504 communicates with the IR Controller 140 via the operating system's communication manager using the IR Controller command structure described earlier to cause the appropriate device IR command signal to be transmitted.

Activation of other keys can invoke a sub-application 502 that will turn on the display backlighting. Yet another key activation can invoke the setup sub-application 501 that permits the user to customize the remote control 10. Activation of still other keys can invoke a different application 508 and pass control of the unit to that application. By way of example, activation of a key labeled "iMosiac" may invoke the Browser application 434 which is described in greater detail below.

Figure 6:
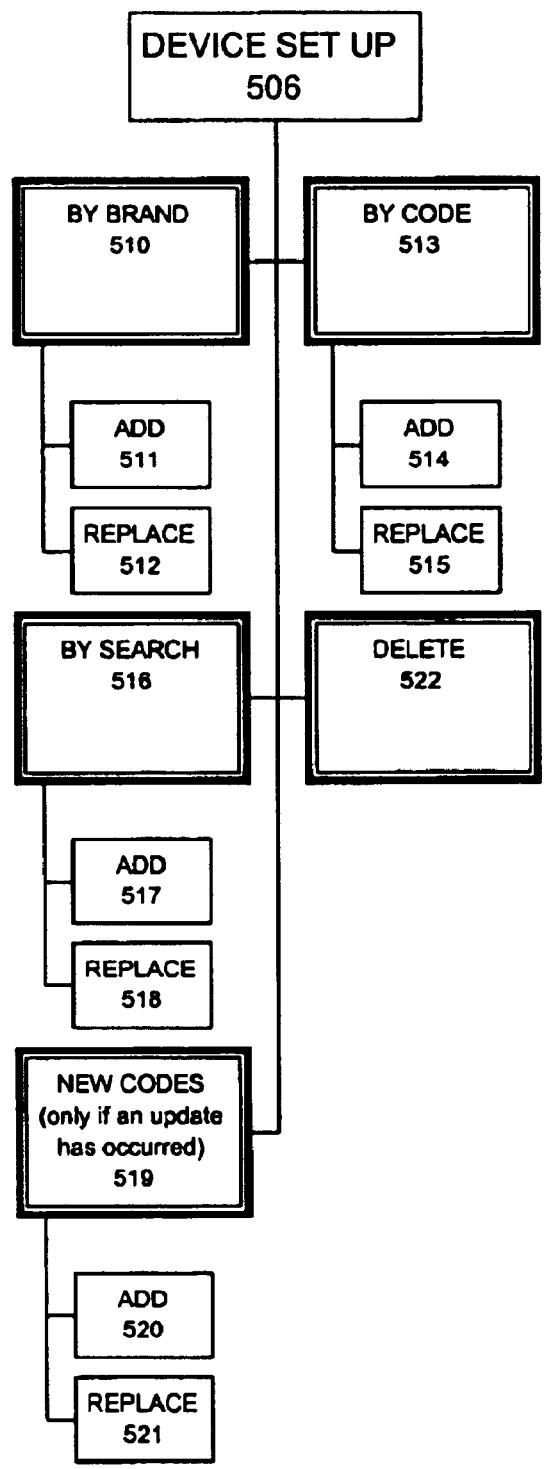
FIG. 6 illustrates an exemplary sub-application program hierarchy for use in setting up the universal remote control illustrated in FIG. 1.

For customizing the universal remote control 10, the setup application 501 is invoked. Customization, as is shown in FIG. 5, can be provided by three menu-driven, sub-applications, namely, the device personalization sub menu 505, the device setup sub menu 506 and the system sub menu 507. The device setup sub menu 506, shown in FIG. 6, comprises five sub-applications that afford the user the opportunity to access all of the infrared control codes required for operation of an entire home electronics system. Control codes may be pre-stored in the memory 110 of the remote control 10, learned into the memory 110 by using the remote control that came with a device, or downloaded from a remote source, e.g., from a source via the Internet.

To select control codes to be available for access to control consumer electronic devices by device type and manufacturer, the setup by brand sub-application 510 is utilized. This sub-application is based in part on technology disclosed in U.S. Pat. No. 5,614,906 entitled "Method for selecting a remote control command set" that is incorporated herein by reference in its entirety. The setup by search sub-application 516 permits the user to select control codes by linearly stepping through the data base of codes by device type, trying each one in turn. The setup by code sub-application 513 permits the user to simply enter a known code number to configure the remote control 10 to make accessible the control codes to control the device(s) corresponding to the known code number. The new code sub-application 519 allows the user to try new codes received during a prior download over the Internet or through customer service via the telephone. Selected/downloaded control codes may be made available for user access by using the add function 511 or used to replace currently accessible control codes using the replace function 512. The delete sub-application 522 can be used to erase all selected control codes, allowing the user to start over with a clean slate.

Figure 7:
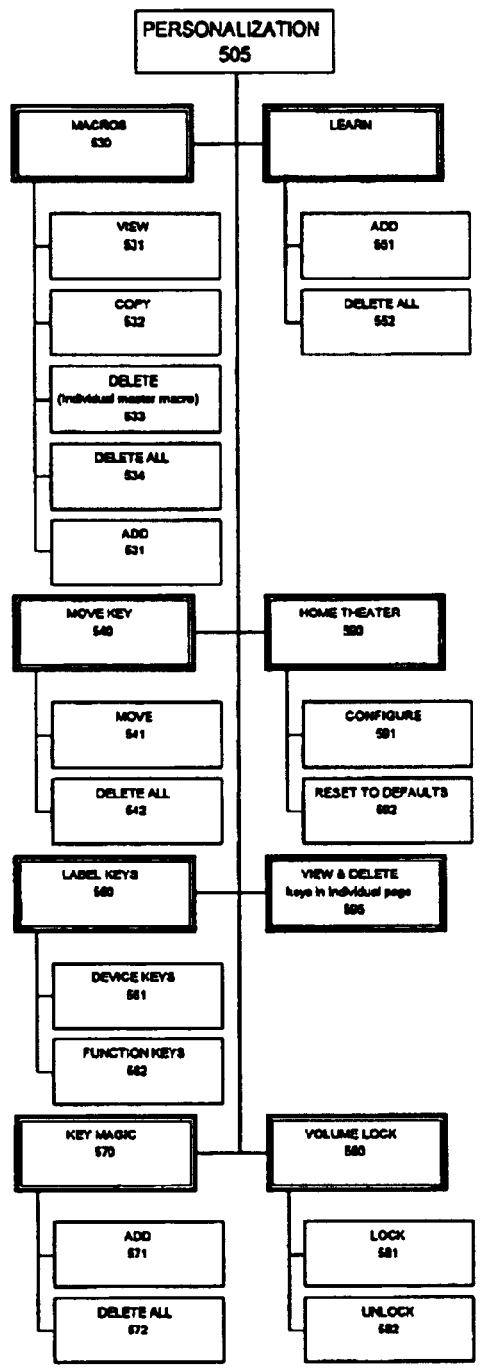
FIG. 7 illustrates an exemplary sub-application program hierarchy for use in personalizing the universal remote control illustrated in FIG. 1.

The personalization sub menu 505 of sub-applications shown in FIG. 7 offers some very powerful sub-applications to the user that permit the remote control 10 to be fully personalized to meet specific needs of a user. For example, the macros sub-application 530 comprises five different functions. The macros sub-application 530 is based on technology disclosed in U.S. Pat. No. 5,959,751 entitled "Universal Remote Control Device" which is incorporated herein by reference in its entirety. The macros sub-application permits the user to add 531, view 532, delete 534, copy 533 (e.g., onto another screen) or delete all 535 macro functions.

To select a key from one device representing a specific infrared function and create a copy of it for use with another device, the move key sub-application 540 is utilized. For example, the move key sub-application 540 can be used to move the channel up function for the TV device such that it is accessible from the VCR device screen. This Sub-Application is based on technology disclosed in U.S. Pat. No. 6,014,092 entitled "Key mover" that is incorporated herein by reference in its entirety. In addition to moving a key 541 a user may delete all 542 keys that have been moved.

To teach the remote control a new function from another remote control, the learn sub-application 550 is utilized. The learn sub-application is based on technology disclosed in U.S. Pat. No. 6,097,309 entitled "Remote control learning system and method using signal envelope pattern recognition" that is incorporated herein by reference in its entirety. A new function can be learned 551 by the remote control and assigned to a pre-defined function key or to a blank key. All learned functions can be deleted 552.

To label new device keys 561, new function keys 562 or to edit existing key labels, the label keys sub-application 560 is utilized. The label key sub-application 562 makes available symbols and lower and upper case characters as well as the backspace, space, and shift for use in creating alphanumeric key labels. A caps lock function can also be provided.

To teach the remote control a new function by entering a three-digit code, the key magic sub-application 570 is utilized. The key magic sub-application 570 is based on technology disclosed in U.S. Pat. No. 5,515,052 entitled "Universal remote control with function synthesis" that is incorporated herein by reference in its entirety. A new function can be added 571 and assigned to a pre-defined function key or to a blank key. All added functions can be deleted 572.

Any key on any device page may be viewed and deleted by the view & delete function 595.

The remote control 10 may also be upgraded and customized by the methods taught in U.S. Ser. No. 09/615,473, filed Jul. 13, 2000, entitled "Customizable and Upgradeable Devices and Methods Related Thereto," which is incorporated herein by reference in its entirety.

The volume lock sub-application 580 affords the user a means for controlling the volume for one device (the amplifier, for example) from another screen dedicated to controlling another device like the TV, for example. The user may institute the locking feature using the lock function 581 or may remove the feature using the unlock function 582.

The home theater sub-application 590 offers the user a means for creating on one or several screens a set of keys that are those most often used keys in a home theater system. The user may configure the feature using the configure function 591 or may remove the feature using the reset to default function 592.

Figure 8:
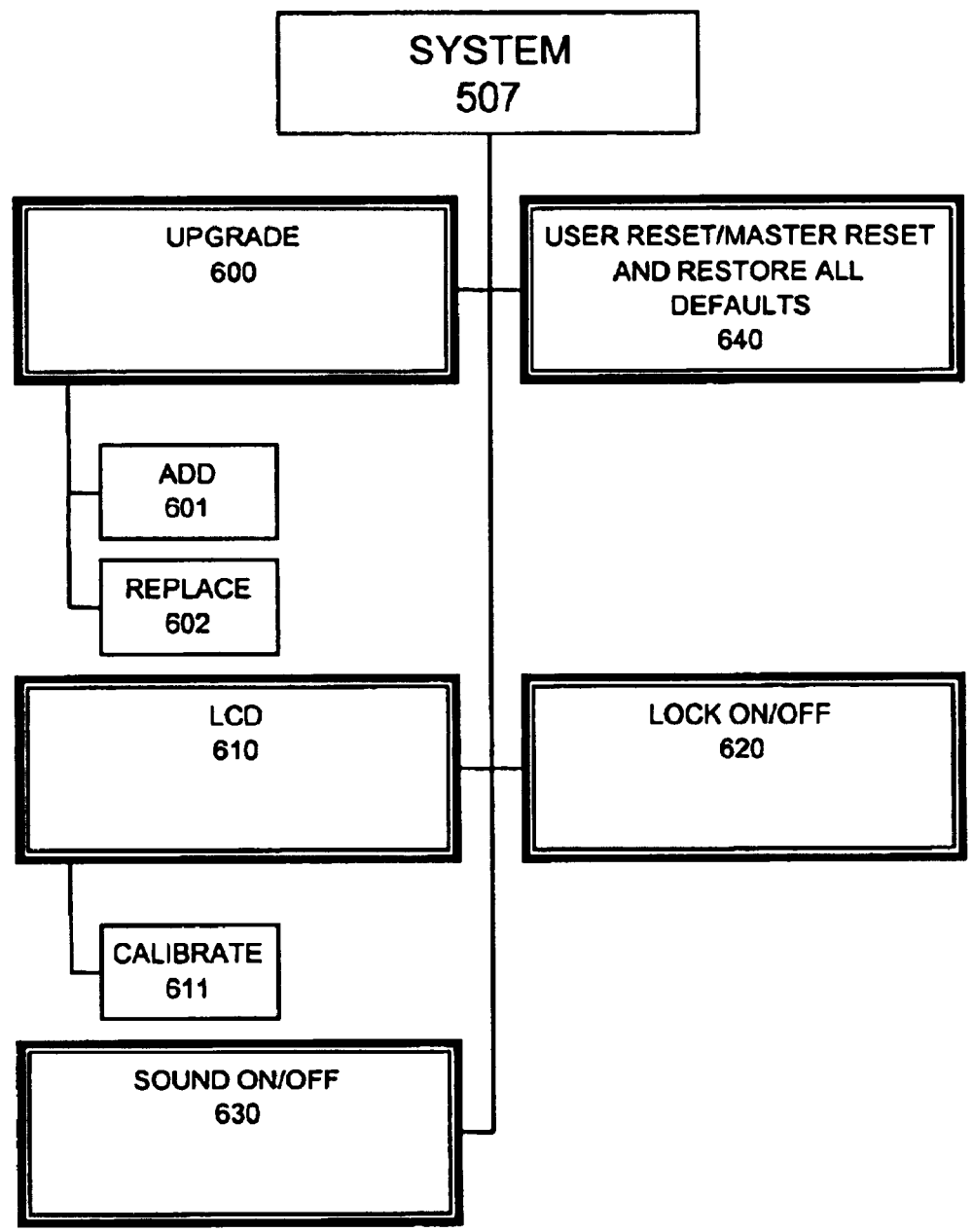
FIG. 8 illustrates an exemplary sub-application program hierarchy for use in establishing the overall system behavior of the universal remote control illustrated in FIG. 1.

The system sub menu 507 of sub-applications, illustrated in FIG. 8, offers the user the ability to affect the overall operation of the remote control. For example, the upgrade sub-application 600 permits the user to add 601 codes from a remote source such as a server on the Internet, via a cable set top box, etc. This application makes it easy for the user to always have the most current and/or correct codes in the subject remote control, even after the purchase or upgrade of new devices for the family home entertainment system. This sub-application may be based on technology disclosed in U.S. Pat. No. 5,537,463 entitled "Magnetic modem in a remote control," U.S. Pat. No. 5,228,077 entitled "Remotely upgradable universal remote control" and in U.S. Pat. No. 5,689,353 entitled "Remote control with two-way data coupling" that are incorporated herein by reference in their entirety. The add function 601 and the replace function 602 make it possible for the user to add or replace codes after the upgrade process is complete.

The LCD sub-application 610 provides a means for the user to compensate for any drift in the calibration of the LCD 24 during long-term use. The user may invoke the calibrate function 611 to return the LCD 24 to factory-level settings.

While using the touchscreen, the user can receive audible feedback that a key has been selected. To this end, a soft clicking sound is issued by the Piezo Buzzer. This sound may be turned on or off using the sound on/off sub-application 630.

After the user has fully personalized the subject remote control, those settings may be locked into place to avoid inadvertent changes. This feature is performed by the lock on/off sub-application 620. The user may return the remote control 10 to its original, factory settings by invoking the user reset/master reset sub-application 640.

To navigate and browse HTML-formatted data supplied from an external source (e.g., via a two-way RF or IR communications link) the remote control 10 includes a browser application 434 that supports a sub set of XHTML-Basic and Compact HTML as proposed and defined by the World Wide Web Consortium. In this manner, the remote control 10 provides for customized user interface and data display since, within the constraints of the remote control hardware (screen size, color, memory availability, etc.), any screen layout of text, images, and/or hyperlink buttons is possible. Thus, any external device equipped with a compatible RF or IR transceiver, such as a personal computer, cable or satellite set top box, home automation controller or security system, CD jukebox, TV set, and the like, can avail itself of the remote control 10 as a data display and interface device via a well-understood standardized set of HTML commands.

In addition to the subset of XHTML-Basic commands supported, the remote control browser can also offer extra META statements as special extensions of the standard to facilitate use in situations which are not classically Web-based. For example, the browser can support a "Full screen" META statement, <META NAME="Any Names" CONTENT="Full_Screen">, that will cause the browser to go to full screen display mode (e.g., no navigation buttons or scroll bars are displayed). Similarly, the browser can support a "Refresh" META statement, <META HTTP-EQUIV="Refresh" CONTENT="xx; URL=http://www.name.com/anything.html">, that will cause the Browser to count a given number of seconds and then display the next html page specified, or if the 'URL=' is not present, refresh the current page. Both of these extensions are useful for authoring displays in which the user is not necessarily aware that the interface presented to him is HTML based via a browser—for example, simple TV guide applications and the like. Additionally, the "Refresh" feature is useful in applications where the data content to be displayed on the remote control 10 needs to be synchronized with a TV or audio program, for example enhanced TV services or karaoke lyrics.

The browser application can also be adapted to support a special extended HTML tag type, "IROP." With this ability, the remote control 10 can be used in connection with HTML pages that are authored to support "buttons" for use in sending IR commands. The general format of the IROP tag is <IROP KEY="1–18, . . . ", LABEL="function name" IMG="file path"> where "KEY=xx,yy . . . " specifies the IR code(s) to be transmitted upon activation of the button (using the IR KeyCodes defined for the IR Controller defined in Table 3 above), and "LABEL=" and "IMG=" respectively define a label and graphic (i.e. icon) associated with the button or link. For example <IROP KEY="10, 7", LABEL="ABC"> would result in the display of "ABC" as a selectable area on the screen. User activation by pressing the "ABC" area on the touch screen would cause the browser to send to the IR Controller 140 a SendIR command containing KeyCode number 10 followed by a SendIR command containing KeyCode number 7, thus causing the IR Controller to transmit the IR codes for the digits "zero" and "seven", i.e. selecting channel 7 on the current consumer electronic device used for channel changing (TV, Cable box, Satellite receiver, etc.). As will be appreciated, this extended IROP tag is useful in situations where it is desired that a user be provided with the ability to interact with an HTML page to initiate the transmission of IR command codes to consumer appliances. Examples of such HTML pages include TV guides, CD jukebox managers, and the like.

Figure 9:
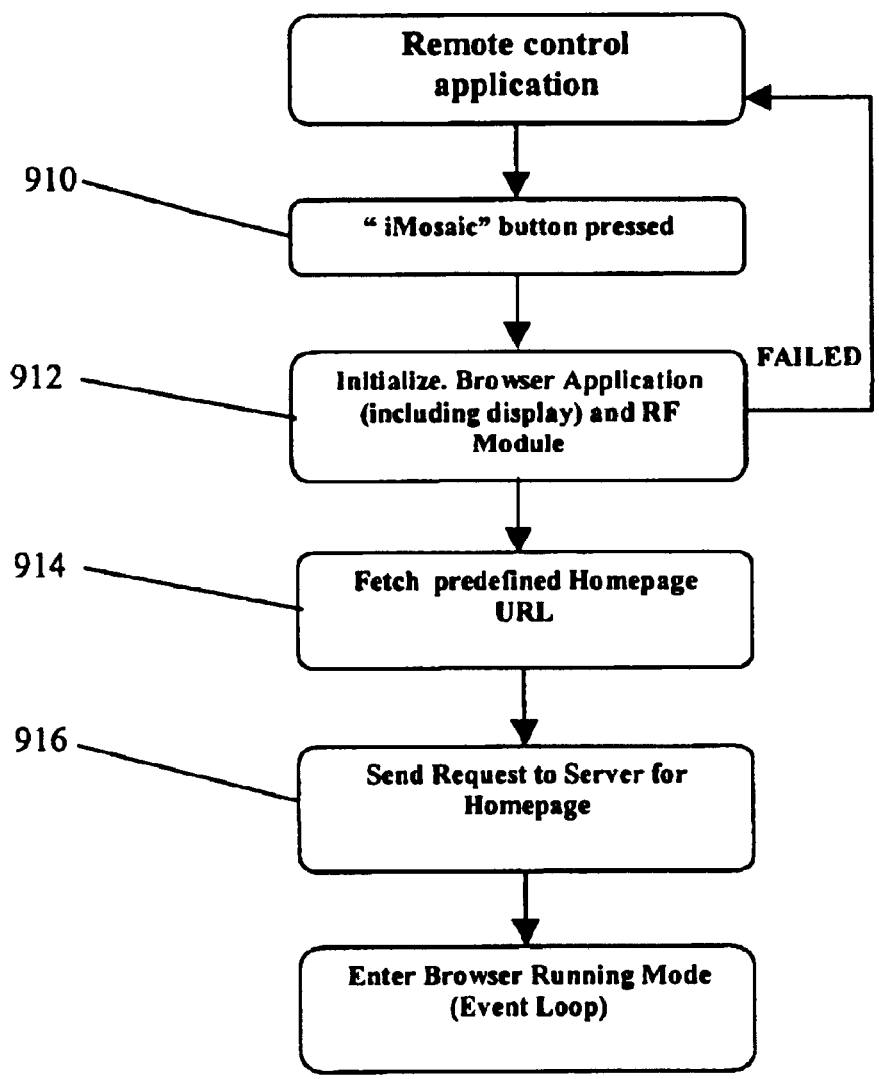
FIG. 9 illustrates an exemplary process for initializing a browser application resident on the universal remote control illustrated in FIG. 1.

Turning to FIG. 9, to invoke the browser application, the user may, for example, press a soft button 910 (such as "iMosaic" 41 on the regular remote control application display screen 24.) When invoked, the browser application starts by initializing itself and the two-way communication interface (via the RF I/O Manager in the illustrative embodiment) 912. If the browser application and two-way communication interface are successfully initialized, the remote control 10 displays the basic Browser screen layout, an example of which is shown in FIG. 11, and issues a request to load a preset home page 914, 916. FIGS. 10a through 10g provide detailed flowcharts of the overall operation of the exemplary Browser Application, showing how subsequent processing of the downloaded HTML data is performed.

Figure 10A:
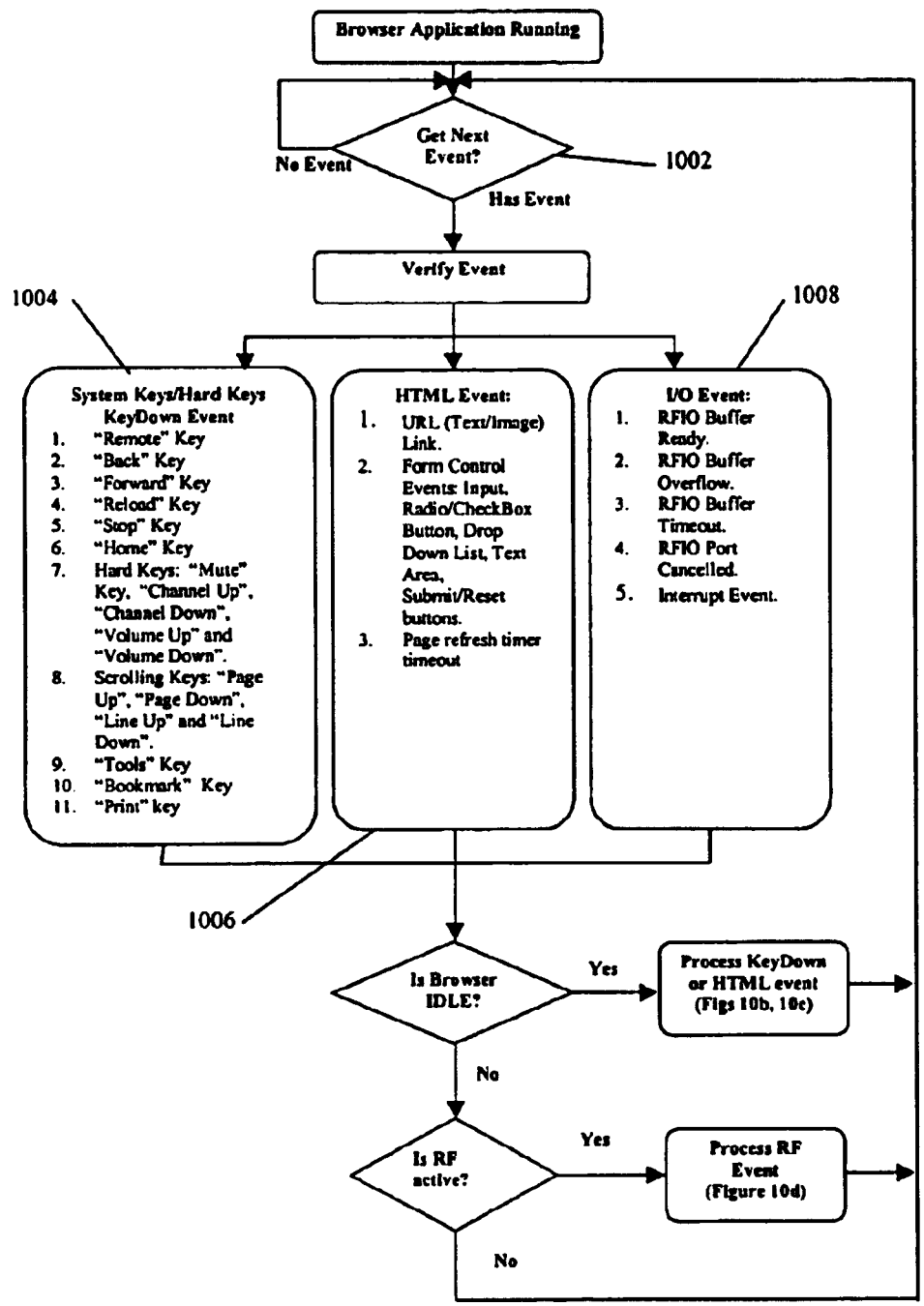
FIG. 10 illustrates an exemplary operational sequence of the browser application resident on the universal remote control illustrated in FIG. 1.
Figure 11:
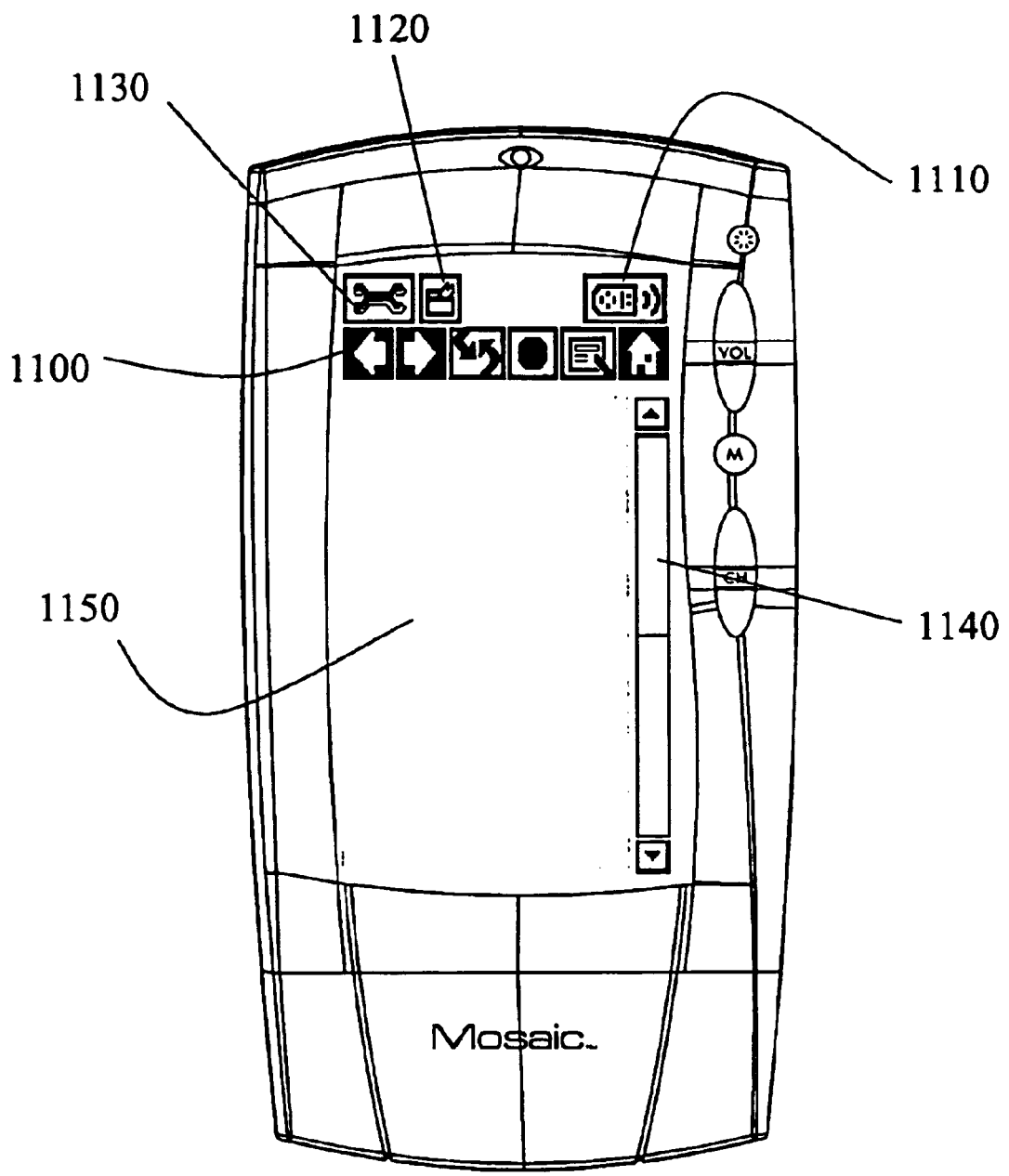
FIG. 11 illustrates an exemplary browser screen layout capable of being displayed on the universal remote control of FIG. 1.

Turning to FIG. 10a, there is shown the overall flow of the exemplary Browser application. As described earlier, the remote control 10 is an event-driven system, so once initialized, the Browser Application simply waits for an Event to occur 1002. Browser-related Events can be classified into one of three general categories: KeyDown Events 1004 which result from user activation of any of the keys shown in FIG. 11 (hard or soft); HTML Events 1006 which result from user activation of an HTML generated item in the current display area (for example a hyperlink, check box, text input area, etc.); and I/O Events 1008 resulting from activity on the two way communication link, timers, or other system-generated interrupts (a low battery indication, for example). The individual processing of each of these categories of Event will be described in further detail later, in conjunction with the figures that follow.

In one exemplary embodiment, internal priorities within the Browser Application are arranged such that, while in process of loading and displaying a page of data via the RF link, it will ignore other inputs such as HTML Events. In other words, it is designed such that a user is required to wait until the current page is completely displayed before initiating any action such as a hyperlink selection. This is evident in FIG. 10a where the "IDLE" status of the Browser application (i.e., not currently loading data via the RF link) is used to determine whether KeyDown and HTML events are processed or not. It will be appreciated that other implementations are also possible, in particular providing the ability to abort a HTML download in progress and initiate a new one by pressing a key or hyperlink in a partially loaded and displayed page.

Figure 10B:
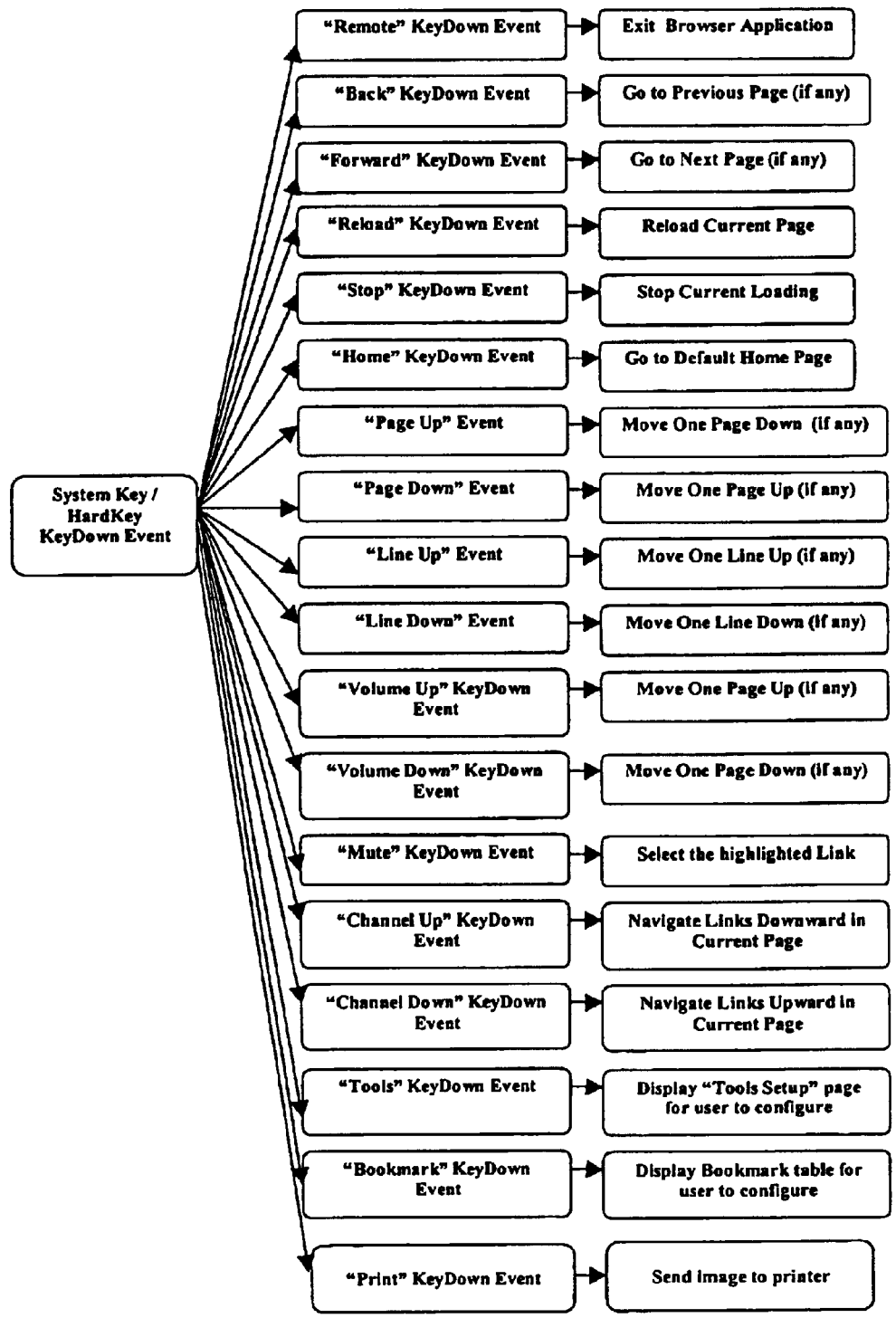

FIG. 10b illustrates the processing of a KeyDown Event, specifically the action taken in response to each of the possible key press user inputs. As can be seen, these actions are used to effect page navigation and browser control in addition to providing means to configure the Browser Application and to return the unit to the (default) Remote Control Application.

Figure 10C:
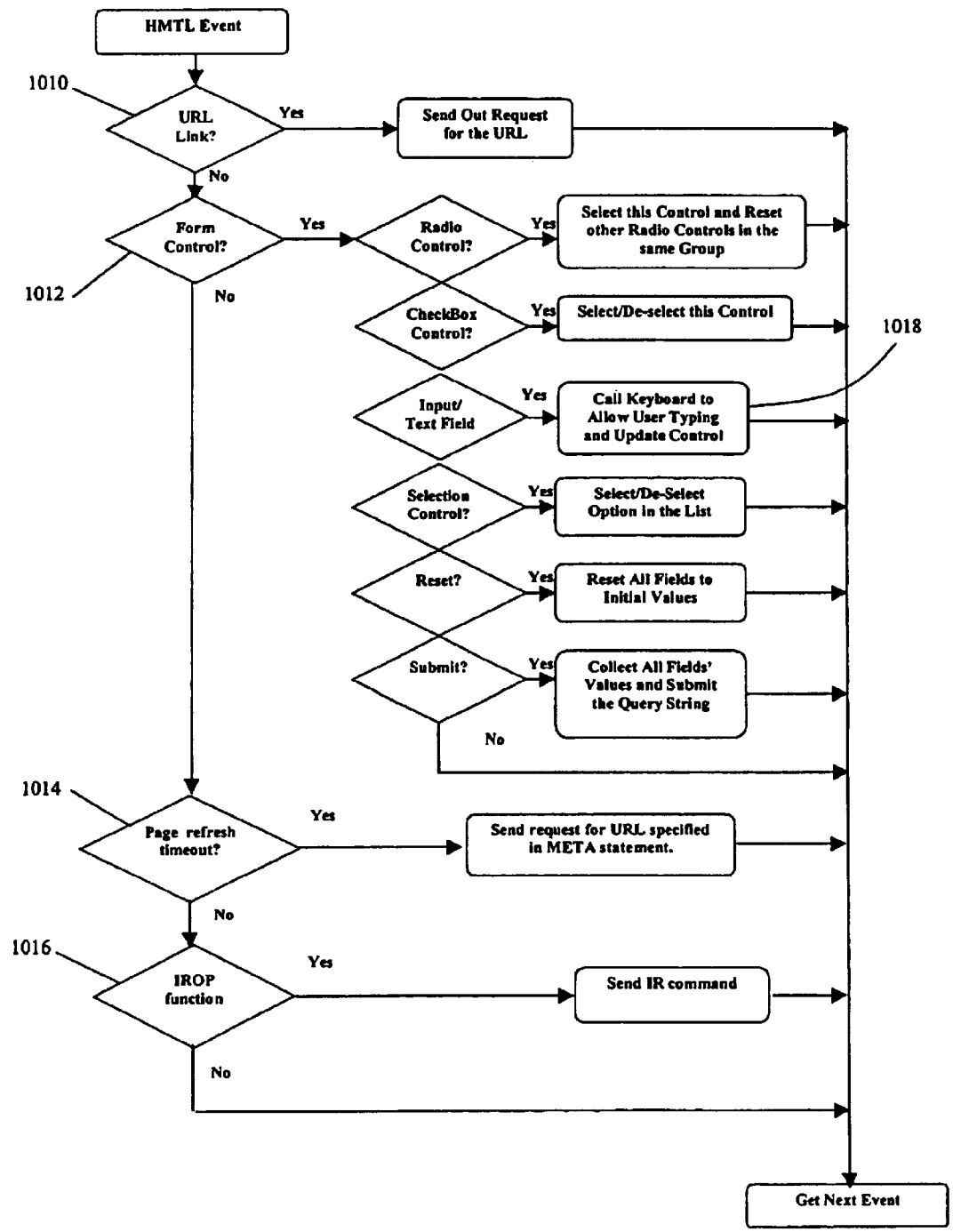

FIG. 10c illustrates the processing of an HTML Event. In the HTML subset supported by the exemplary Browser Application, only four classes of HTML Event can occur: Activation of a hyperlink 1010, activation of a form control field 1012, expiration of a "refresh" META statement timer (a special extension to standard HTML which allows periodic reloading of a page), 1014 or activation of a IROP field (a special extension to standard HTML which allows IR commands to be transmitted to consumer appliances) 1016. Activation of a hyperlink results in a request for the contents of the specified URL to be issued via the communications link, after which the Browser Application returns to the "Get Next Event" waiting state shown at the top of FIG. 10a pending receipt of the requested data. Activation of a forms control function results in the appropriate action as shown in FIG. 10b (note that not all possible HTML forms functions are supported by the subset, unrecognized control requests are simply ignored), again followed by a return to the "Get Next Event" waiting state. Expiration of a "refresh" timer causes a request to be issued via the communications link for the URL specified in the META statement (or, if no URL is specified, the current page to be automatically reloaded) and a return to the "Get Next Event" waiting state pending receipt of the requested data. Activation of an IROP control causes the Browser to issue SendIR commands to the IR Controller, as described earlier, also followed by a return to the "Get Next Event" waiting state.

Figure 10D:
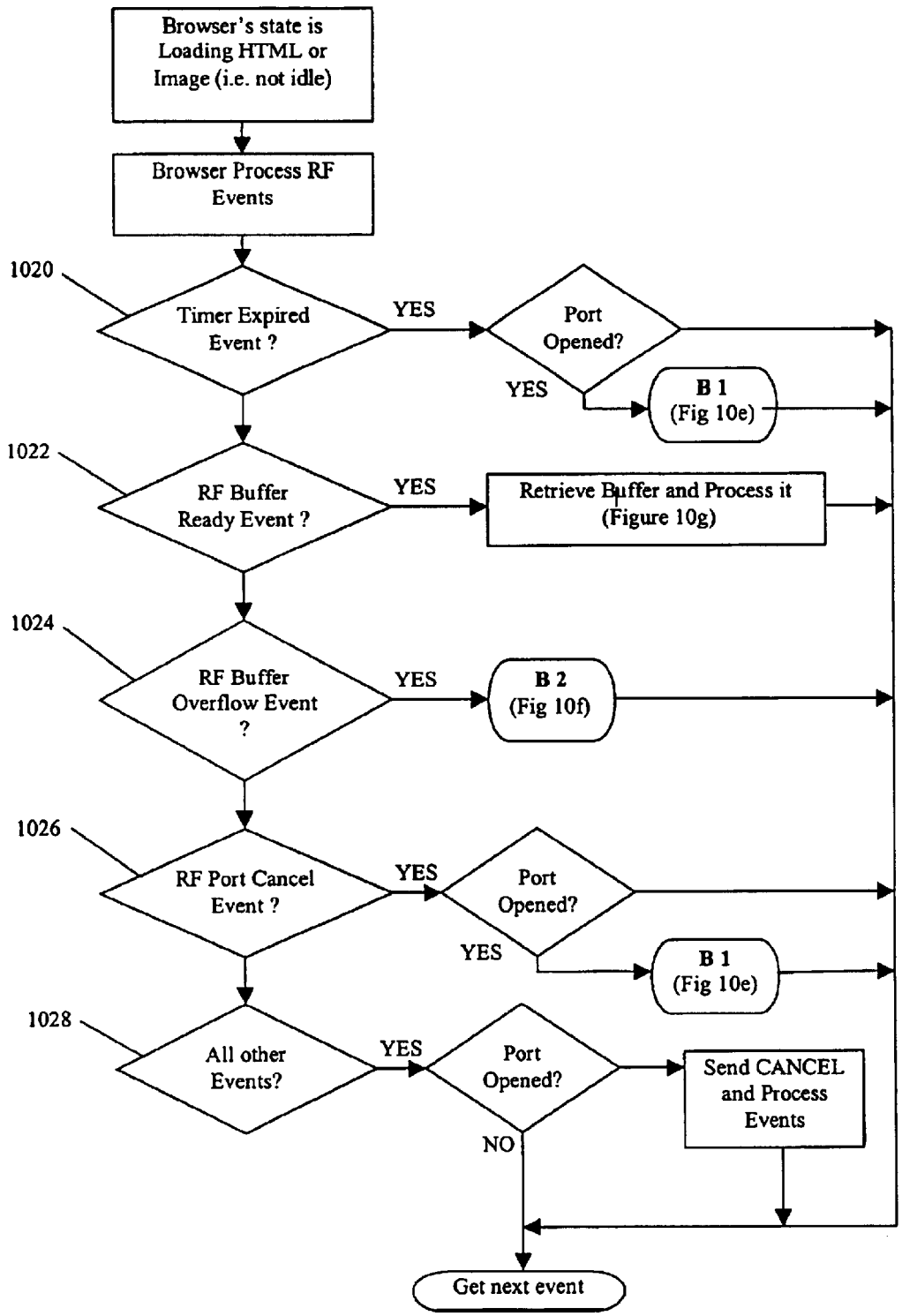
Figure 10E:
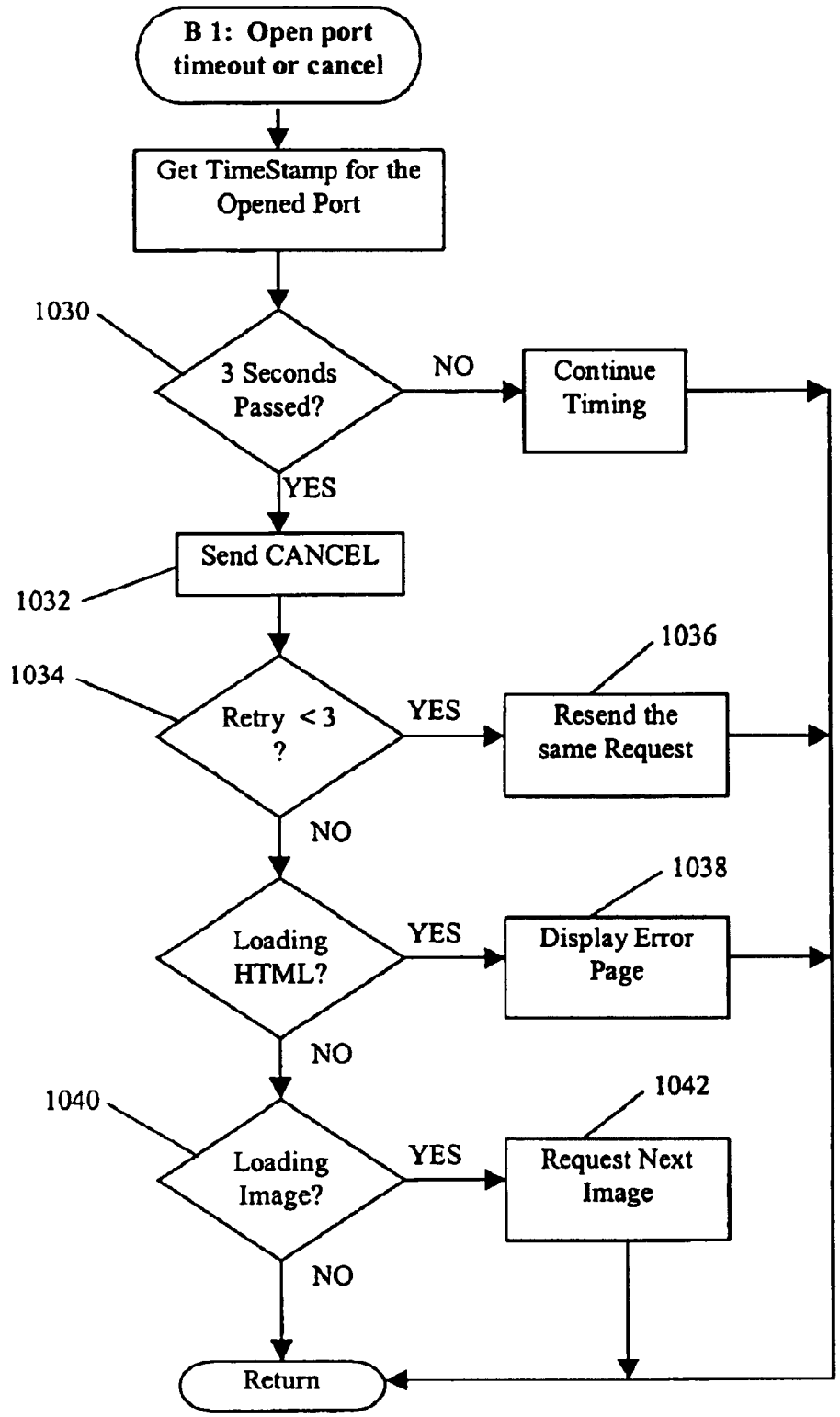
Figure 10F:
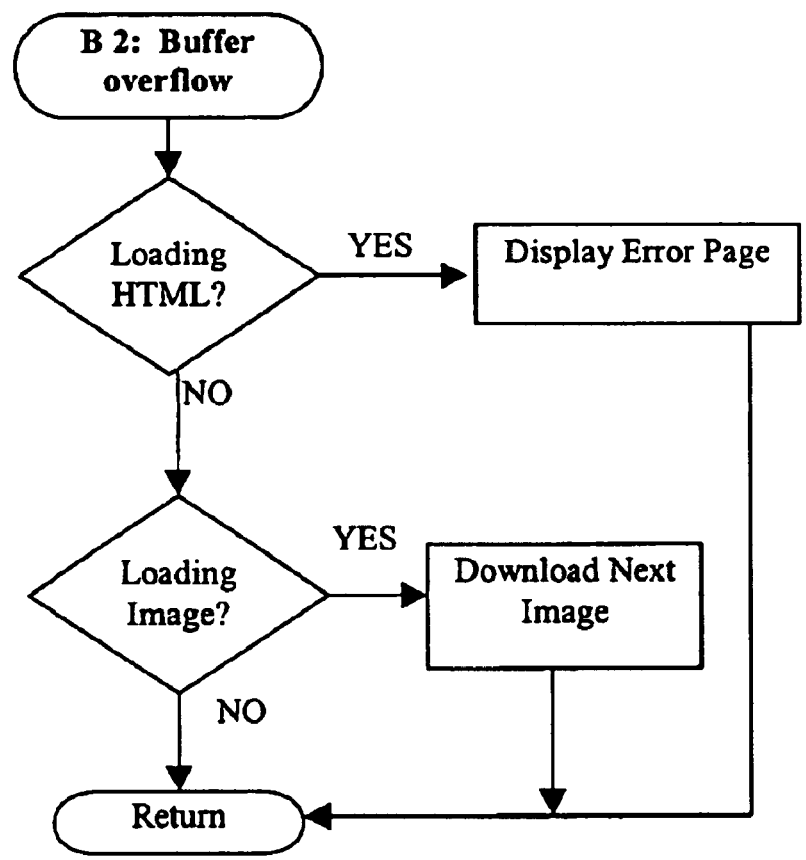
Figure 10G:
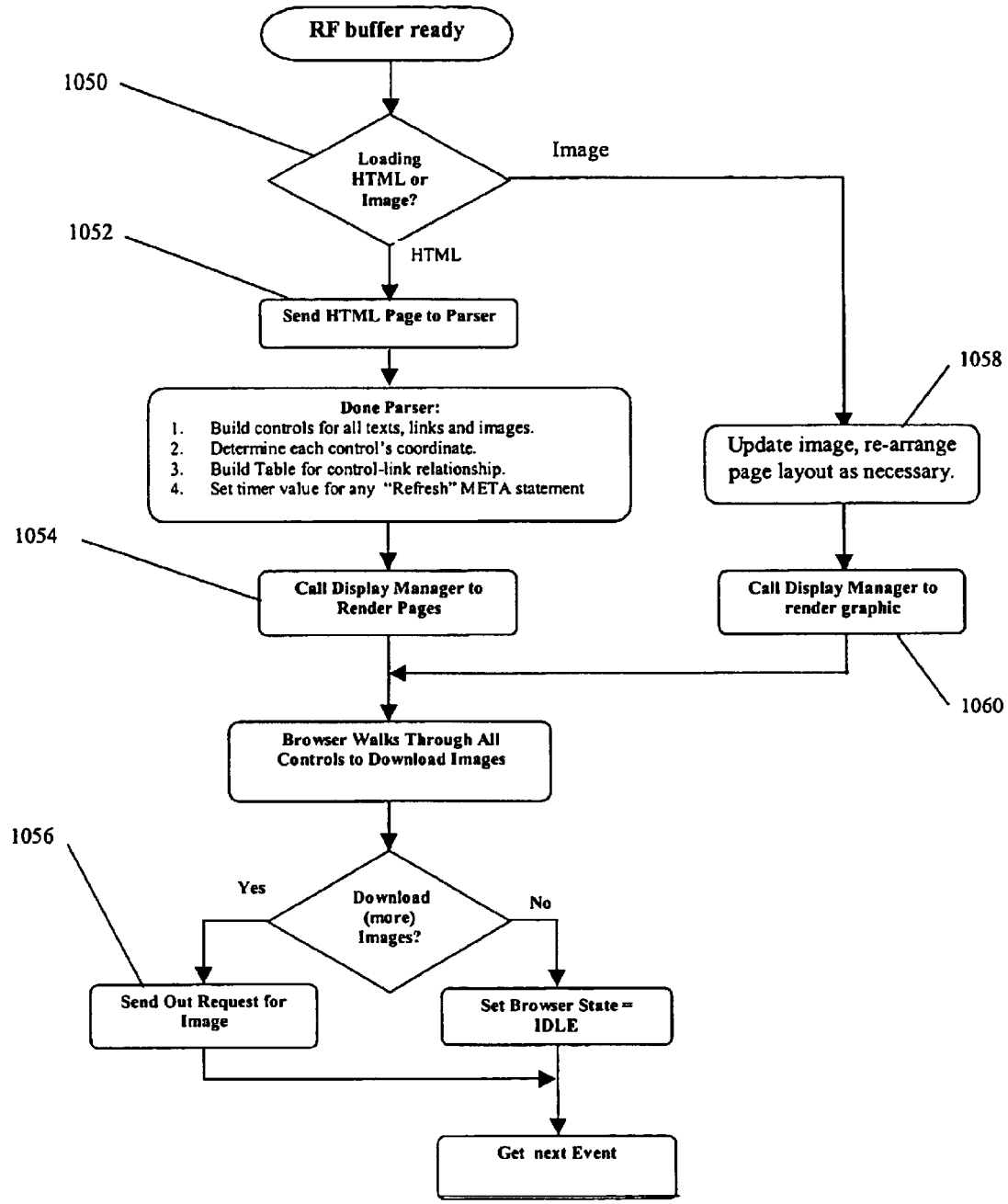

FIG. 10d illustrates the processing of an RF I/O Event. All communications transactions are preferably timed in order to allow appropriate action to be taken by the Browser in the event the communications link is interrupted, for example by the user wandering out of RF range. Thus, the first I/O Event that is checked for is a timer expired status 1020. If there is a Port currently open (i.e., activity in progress) the timer expired event is handled as shown in FIG. 10e, described in more detail below. If the Event is an "RF Buffer Ready" event 1022, indicating that there is received data ready for processing, the event is handled as shown in FIG. 10g, described in more detail below. An RF buffer overflow event 1024 signifies an error condition, handled as shown in FIG. 10f, described in more detail below. If the sending (server) side issues a "Cancel" command (a request to abort transmission), this event 1026 is handled in a similar manner to a timeout event. All other types of events 1028 represent conditions which should abort any page download currently in progress (e.g. a low battery condition), and thus result in the Browser issuing a "CANCEL" request to the server (the inverse of the server "CANCEL" described previously) provided a Port is currently open.

Figure 21:
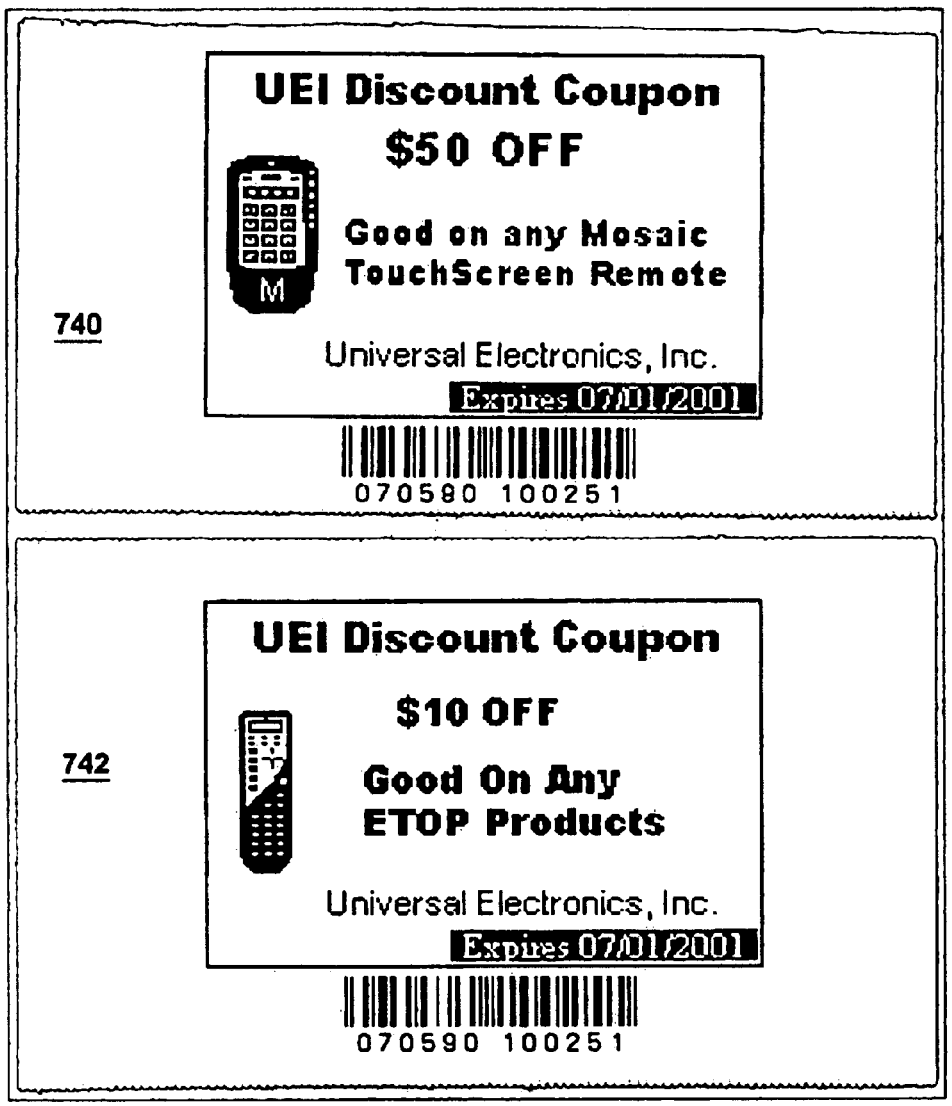
FIG. 21 illustrates sample thermal printed coupons.

FIG. 10e shows the error processing invoked in the case of a timeout or a server initiated "CANCEL" request when the Browser application is not "idle," i.e., it is loading HTML or image data via the RF link. If a given time, e.g., three seconds, has not elapsed since the last activity on this port 1030, timing continues without any action. If the given time has been reached or exceeded, the Browser issues a "CANCEL" request to the server 1032. It then determines if a given number of retries, e.g., three, have already occurred for this particular request 1034. If the number of retries has not been exceeded, the Browser reissues the request 1036. If all of the retries have been exhausted, the Browser takes error action as appropriate: in the case of a failed HTML page download it displays an error message to the user 1038 (FIG. 21 is a example of such a message); if the failure occurred during the download of an image 1040, the Browser simply skips display of that image and proceeds to request the next image 1042, if any exists. (The processing of HTML and requests for image data is described in more detail later in conjunction with FIG. 10g.)

FIG. 10f shows the error processing that occurs in the event of a buffer overflow. As can be seen, the actions taken by the remote control 10 are similar to those described above in conjunction with an exhausted retry count.

FIG. 10g shows the processing steps that occur upon receipt of a buffer fall of data Events from the RF I/O Manager. In this case, the Browser first checks its internal status to determine if it is currently expecting HTML or image data 1050. If expecting HTML data, the HTML page is sent to the HTML parser 1052, which processes the HTML data and breaks it down into individual elements for display (text strings and images), position coordinates for each hyperlink or control within the display, and a table of control-link relationships. The HTML parser also sets the appropriate timer if a "refresh" META statement is encountered. When the HTML parser has completed its analysis, the display information is passed to the Display Manager 1054 for rendering on the LCD screen. Once the basic HTML page is displayed (i.e., text, links, controls, etc. together with "place holder" icons for the locations of graphic images) the Browser then issues requests for any graphic images called out in the HTML source, loading and displaying the graphic images one by one until all specified graphics have been displayed. This is achieved by issuing a request for the next graphic file 1056 via the RF communications link and then returning to the "Get Next Event" state (FIG. 10a).

When a response is received, the next RF buffer ready Event will find the Browser in an "expecting image data" state. This will cause the opposite branch to be taken at the top of FIG. 10g. Here, the Browser, after making any necessary adjustments to page layout resulting from the insertion of the new graphic 1058 (in some instances the graphic size may have been predefined in the HTML, in which case no adjustment is necessary since the appropriate area is already allocated, but in others the final graphic may differ in size from the "place holder" icon and require adjustment to the balance of the page layout to accommodate it), displays the graphic data just received 1060 and issues a request for the next graphic. After the last graphic has been downloaded and displayed, the Browser set its internal status to "IDLE" (thereby enabling recognition of HTML and KeyDown Events) and returns to the "Get Next Event" state (FIG. 10a).

FIG. 11 shows an exemplary, basic touch screen display layout for the remote control Browser. In the illustration, the layout comprises a toolbar 1100 containing the usual Browser control items (e.g., "back," "forward," "reload," "stop," "go to," and "home" illustrated from left to right), a key 1120 to access previously entered bookmarks, a general display area 1150 in which HTML formatted data is displayed, and a scroll bar 1140 used to navigate pages of data which are longer than the display space. In addition, the screen may include two control elements specific to the browser application, namely, a key 1130 to access set up routines used to adjust items such as RF link addresses, home page URL, etc., and a key 1110 used to return the unit to the basic remote control application 432 when use of the Browser is complete.

Figure 13:
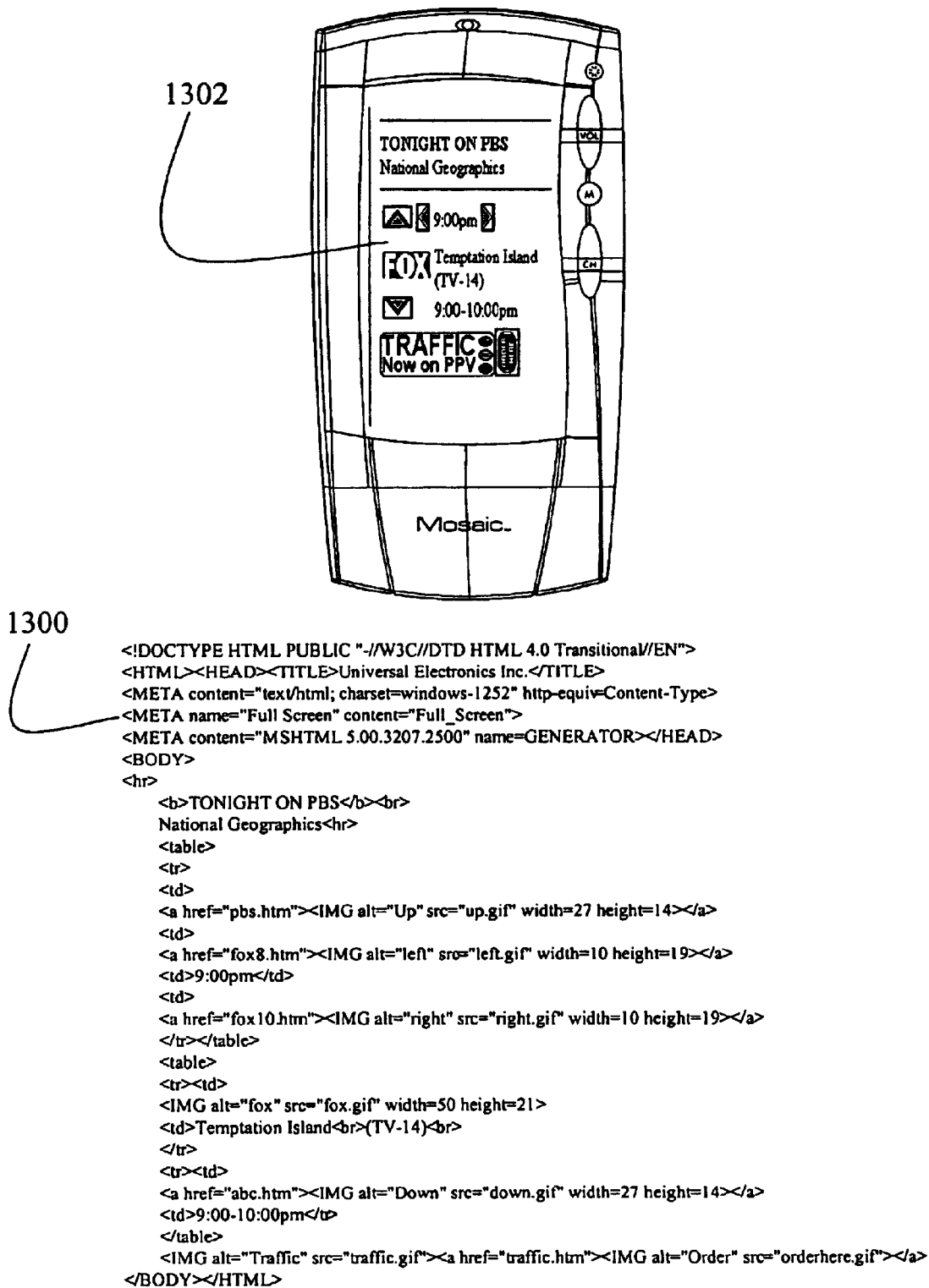
FIG. 13 illustrates an exemplary browser-based TV guide screen displayed on the universal remote control of FIG. 1 and the HTML source for use in displaying the TV guide screen.

The "home page" URL first loaded by the Browser application need not be Web based in the classical sense. Rather, the "home page" may be an address pointing to an HTML formatted interface to a home control system as illustrated in FIG. 12. The "home page" illustrated in FIG. 12 shows an example of how the universal remote control 10 can display simple icons and messages 1202 useful in receiving information from appliances around the home and, in turn, controlling them. In yet another example, the "home page" initially loaded might take the form of a TV guide display loaded from a cable or satellite set top box including program viewing information 1302, as illustrated in FIG. 13. Note that this particular example makes use of the "full screen" META statement 1300 as described above to hide the generic browser controls (e.g., "back," "forward," "reload," etc.) from the user.

Figure 14:
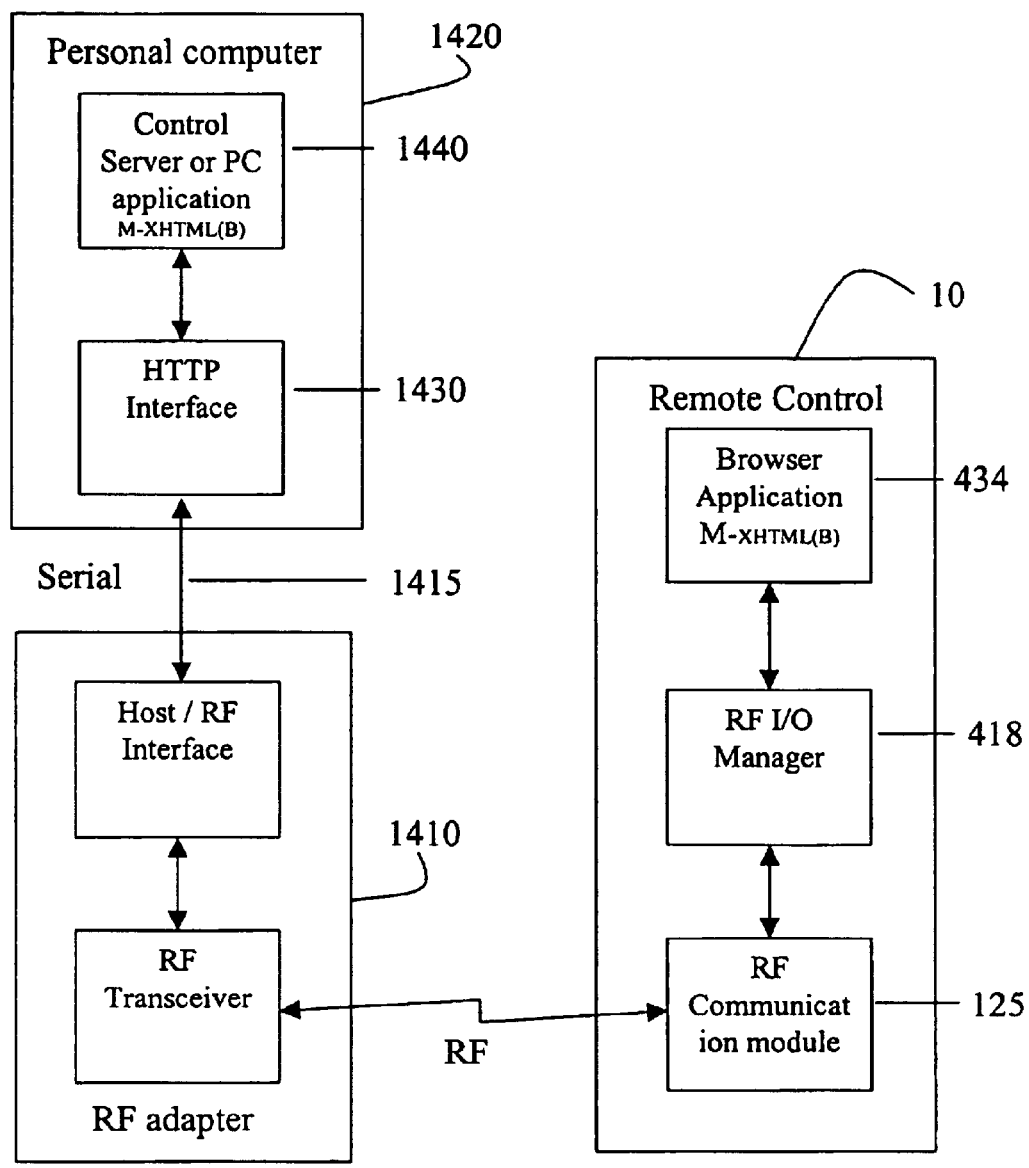
FIG. 14 illustrates a two-way communication system including a computer, a computer network, and the universal remote control illustrated in FIG. 1.

By way of further example, FIG. 14 illustrates the use of the universal remote control 10 as part of a two-way communication system. In this illustrated example, the remote control 10 is used as a platform to browse the Internet, using a personal computer 1420 as a gateway or proxy server. Requests by the user of the universal remote control 10 for access to certain information located on Web pages on the Internet are sent through the RF I/O Manager 418 and RF Module 125 to a matching RF transceiver unit 1410 which is attached to the personal computer 1420 via one of its serial ports 1415. Software resident in the personal computer 1420, including an HTTP interface and server application 1440 formats the request appropriately and forwards it to the specified Web URL. When a response to a request is received at the personal computer 1420, the personal computer 1420 performs any format conversion required for compatibility with the subset of HTML supported by the remote control 10, and then forwards it to the remote control 10 via the reverse of the path described above. In this manner, Web content may be ultimately displayed on the universal remote control 10.

Figure 15:
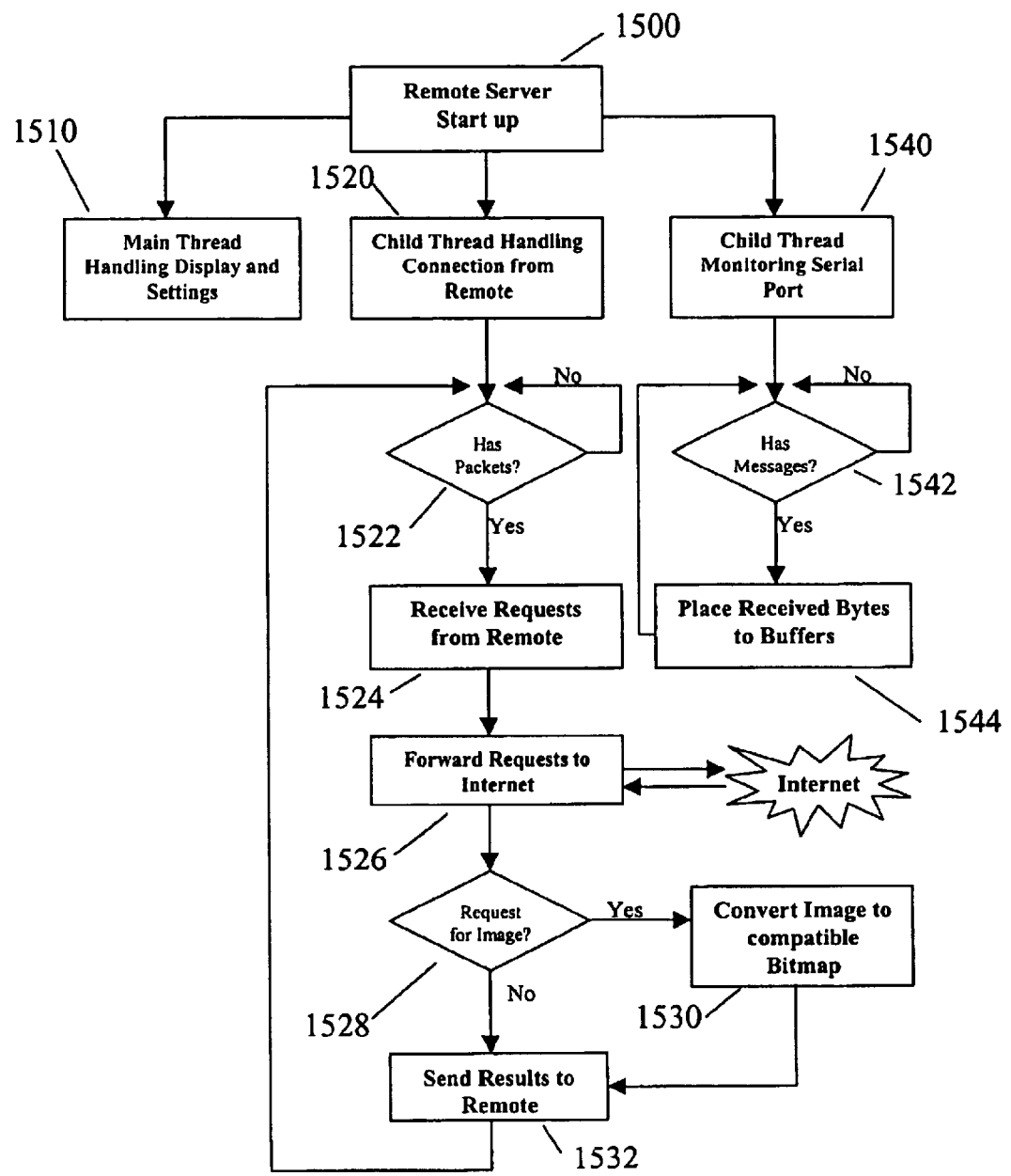
FIG. 15 illustrates an exemplary Server Application Flow Chart for use in connection with the two-way communication system illustrated in FIG. 14.
Figure 16:
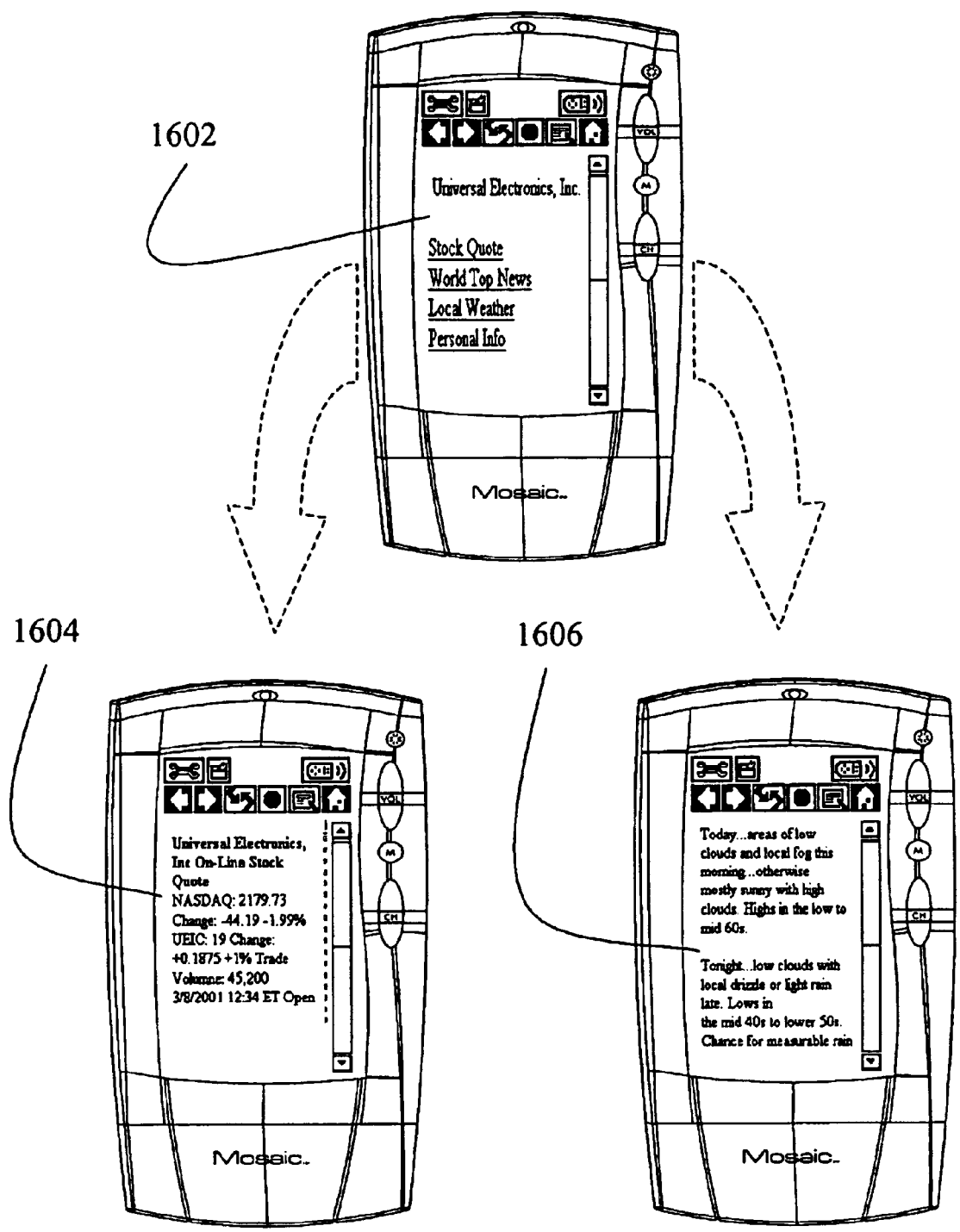
FIG. 16 illustrates an exemplary display of Web-based data using the browser of the universal remote control illustrated in FIG. 1.
Figure 17:
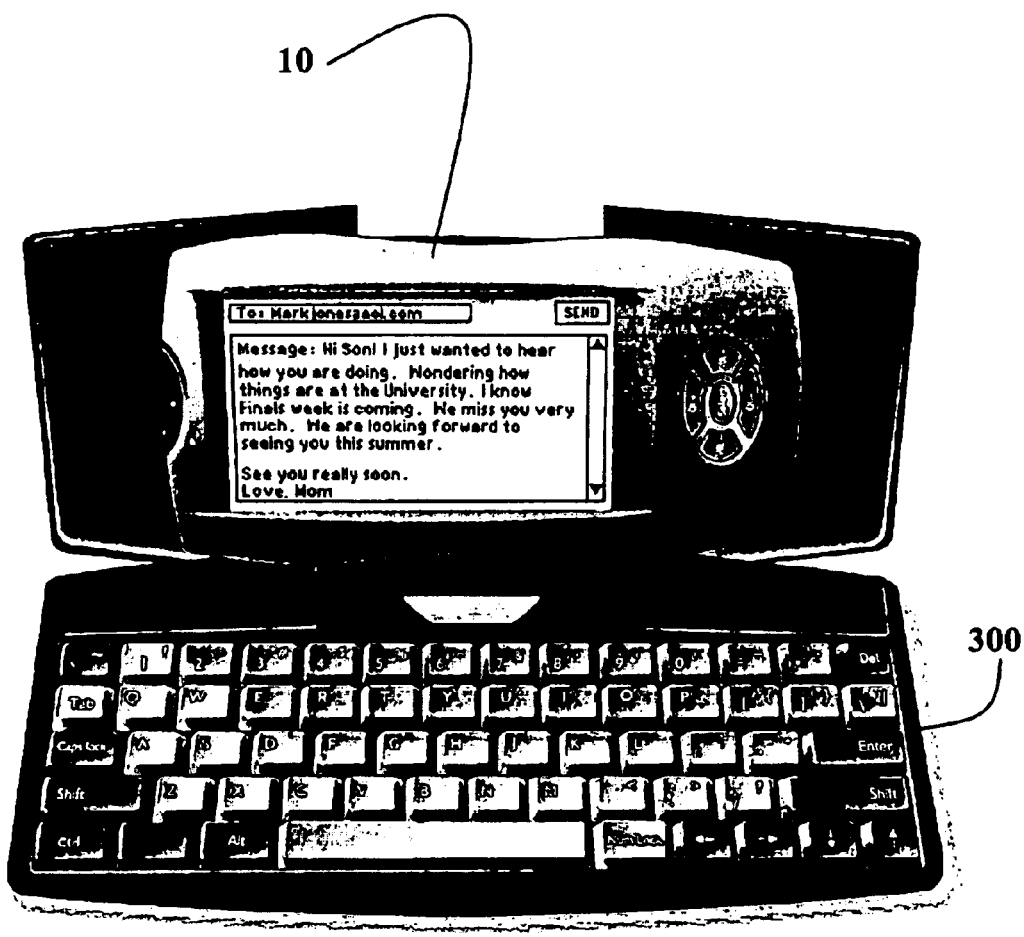
FIG. 17 illustrates the universal remote control illustrated in FIG. 1 docked to an optional keyboard.

In the illustrative example, the PC application that provides the Internet access for the remote control 10 is called the server application. As illustrated in FIG. 15, the server start up module 1500 is invoked when the server application is started on the personal computer 1420. The server application manages the display (to the PC screen) and internal settings 1510, the transfer of data 1520 between the Internet and the remote control 10, and the external serial port 1540 to which the PC-side RF transceiver unit 1410 is attached. As serial messages are received 1542 they are placed in an internal data buffer 1544 from which they are subsequently processed and delivered to the Internet 1522,1524,1526. If Internet data is received 1526, then it is converted to a compatible format if necessary 1528, 1530 and then sent to the remote control 10 for display 1532. It will be appreciated that while this example uses a personal computer based Web gateway, similar systems can readily be implemented using various other devices to implement the gateway, for example a cable or satellite set top box, a Web-enabled TV set, a residential home gateway controller, a Web-enabled game console, a personal video recorder, etc.

Figure 18:
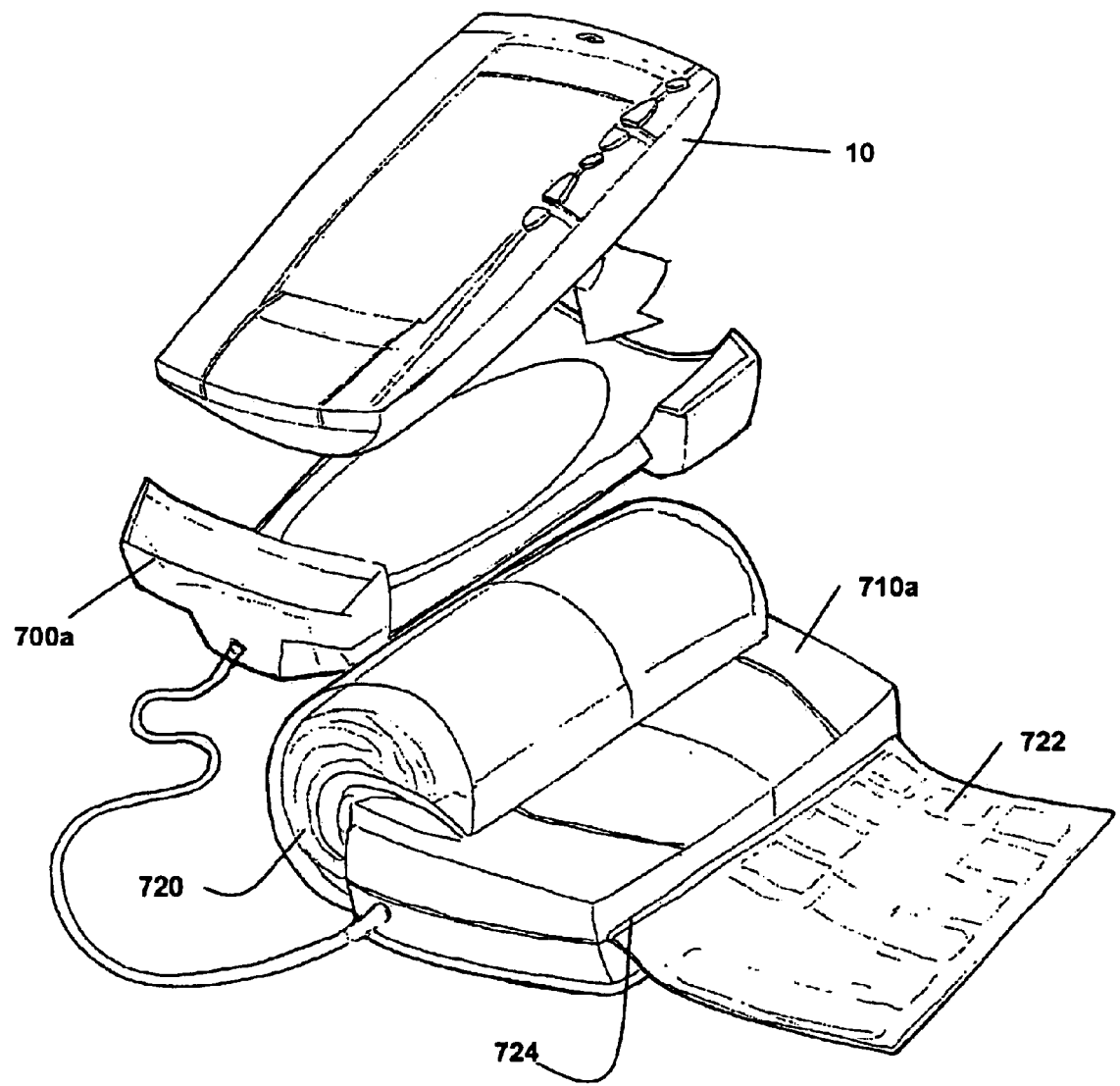
FIG. 18 illustrates the remote control being placed in a base that is connected to a separate printer.
Figure 19:
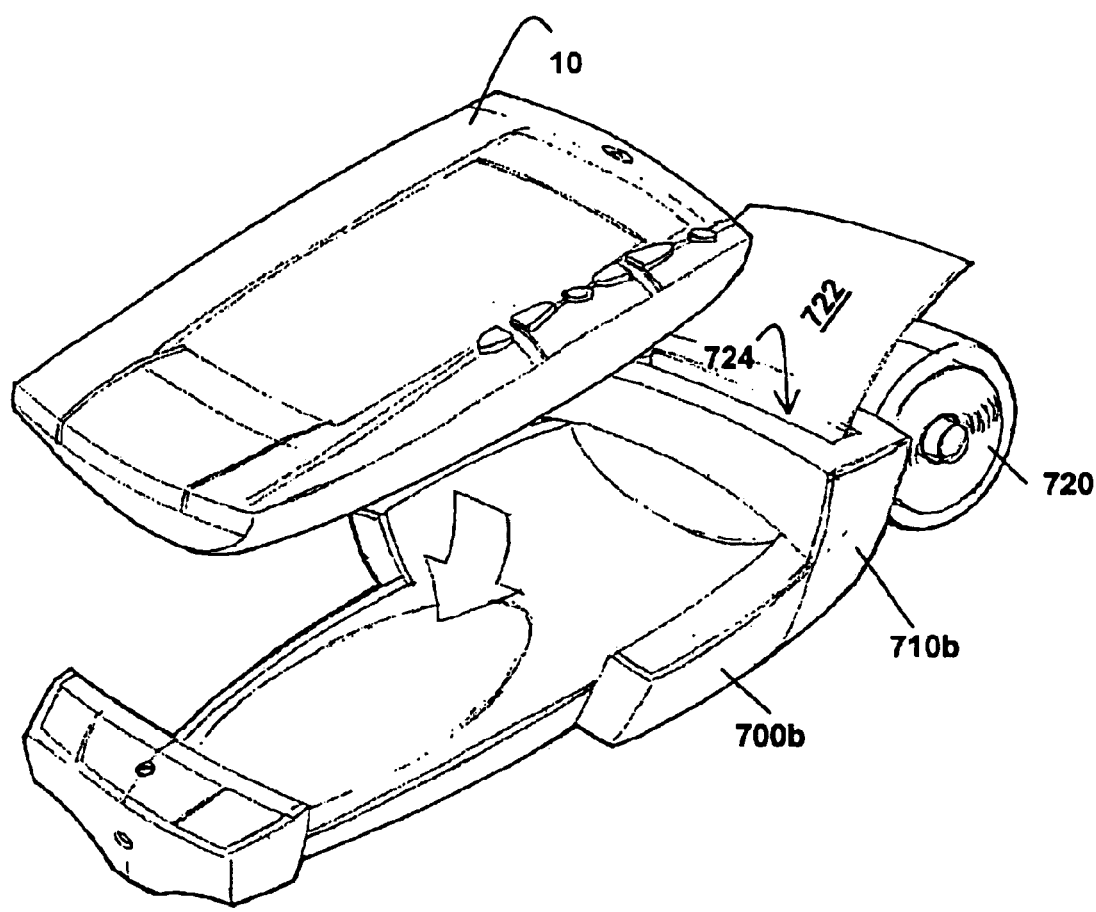
FIG. 19 illustrates a base with a top-mounted integral printer.
Figure 20:
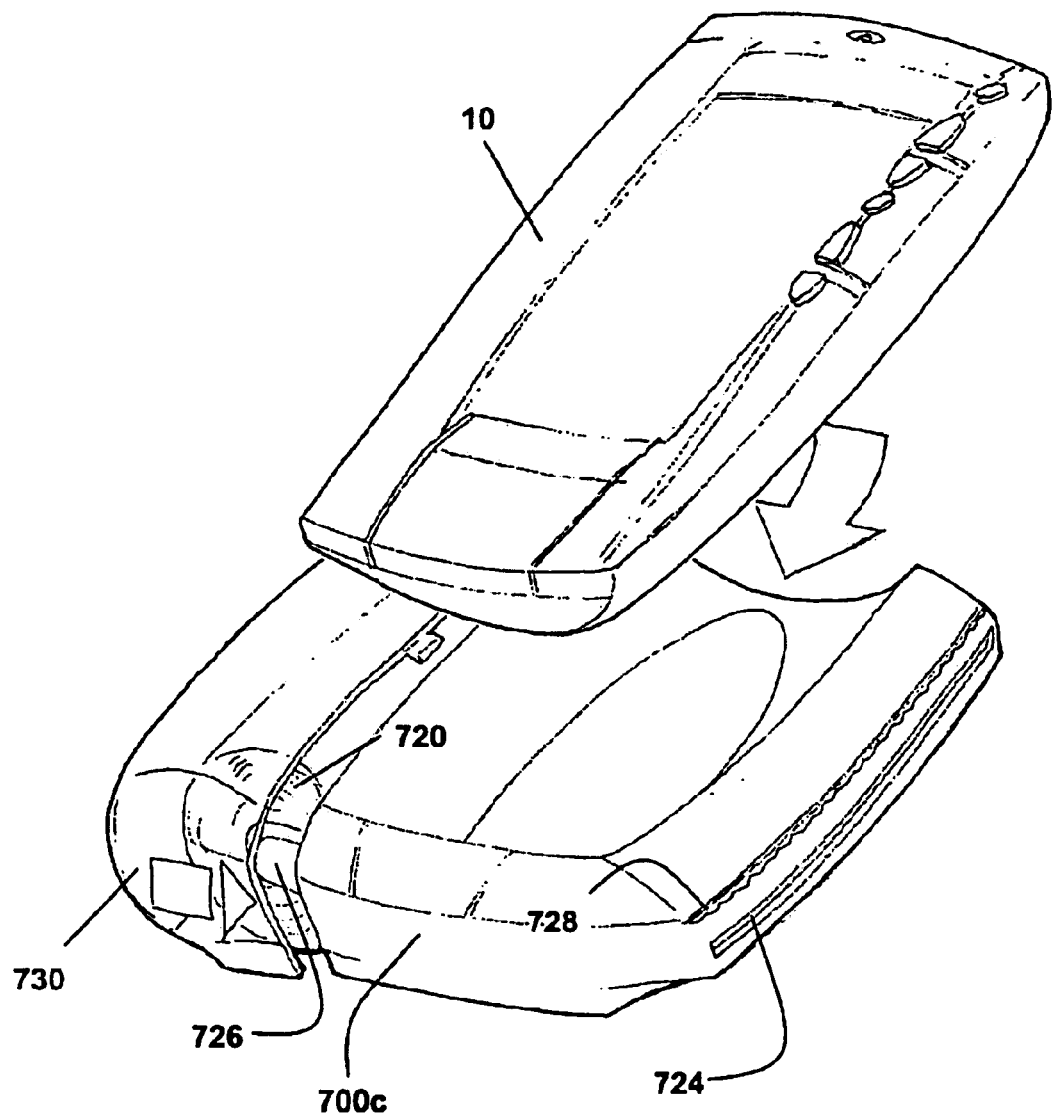
FIG. 20 illustrates a base with an integral printer have a side mounted paper roll spool and a print channel and tear-bar mounted on the opposite side.

FIGS. 18–20 depict exemplary bases 700 connected to printers 710. Specifically, FIG. 18 illustrates the remote control being placed in a cradle-style base 700a. The cradle-style base 700a is connected to a separate thermal printer 710a. The printer 710a supports supply paper 720, which may be conveniently supplied in conventional roll form or flat form. Printed paper 722 exits the discharge opening 724, which is preferably an elongated slot.

FIG. 19 illustrates a base 700b having a top-mounted integral printer 710b.

FIG. 20 illustrates a base 700c having a side mounted paper supply in the form of a spool 726. The paper 722 (not shown in FIG. 20) exits the discharge opening 724 that opens on the opposite side of the base 700c. A tear-bar 728 mounted parallel to the discharge opening 724, provides an efficient means of removing printed paper 722 (not shown in FIG. 20). A removable paper supply cover 730 removably attaches to the first side of the base 700c and maintains the integrity of the supply paper 720.

The printers 710 provide a convenient method for obtaining a hard copy of data from the remote control 10. The remote control 10 can act as an interface with a consumer electronic device to obtain hard copies of data. The data may reside within memory in the consumer electronic device (e.g., a user manual) or the consumer appliance can act as a conduit for information obtained from another source (e.g., a set-top box connected to the Internet). By way of further example, coupons 740 and 742 shown in FIG. 21 may have been requested by a user from a PC for instance. Targeted coupons (or advertising) may be automatically downloaded into the remote control 10 based on the type of program content (e.g., which news shows and entertainment shows) for which the user has a preference. For example, a user that views a predetermined percentage or quantity of outdoor programs (measured, e.g., in minutes or number of shows) may be sent camping coupons. While coupons are used for illustrative purposes herein, it will be appreciated that many other types of printable material are suitable for output using the system described. For example, confirmation of orders placed with shopping channels, menu listings from local restaurants, driving directions to advertised businesses, tickets to events, etc., may all be obtained through the remote control 10. Associated listings of additional material, for example books, videos, sound tracks, etc. related to shows watched, or being watched, maybe sent or requested. When coupled with the aforementioned browser/internet capability, the printer 710 may be used to obtain a hard copy of an email, for example.

Users notepad capability is obtainable through use of the display module 180. The display module 180 can be used to capture the image in memory 110 for later printing with printer 710.

Figure 22:
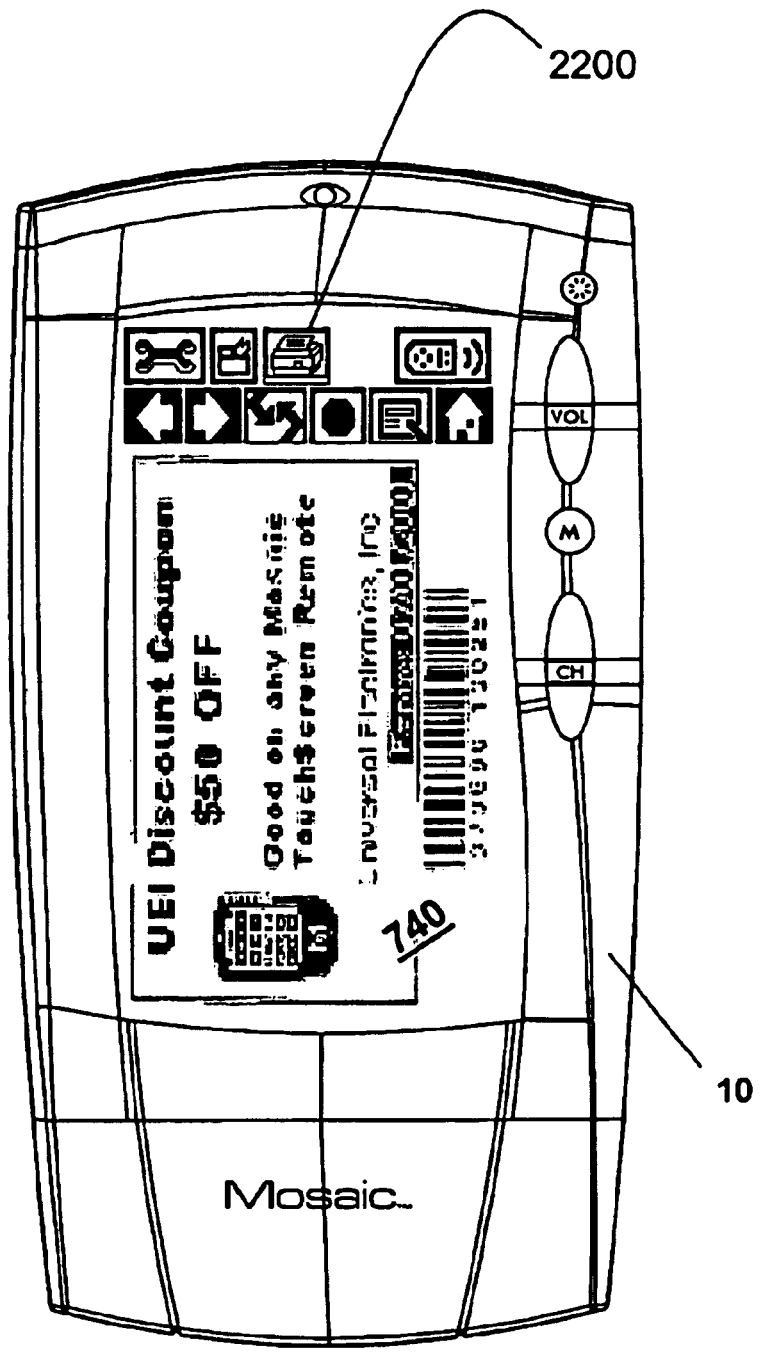
FIG. 22 illustrates a remote control displaying a coupon and a "Print" button.
Figure 24:
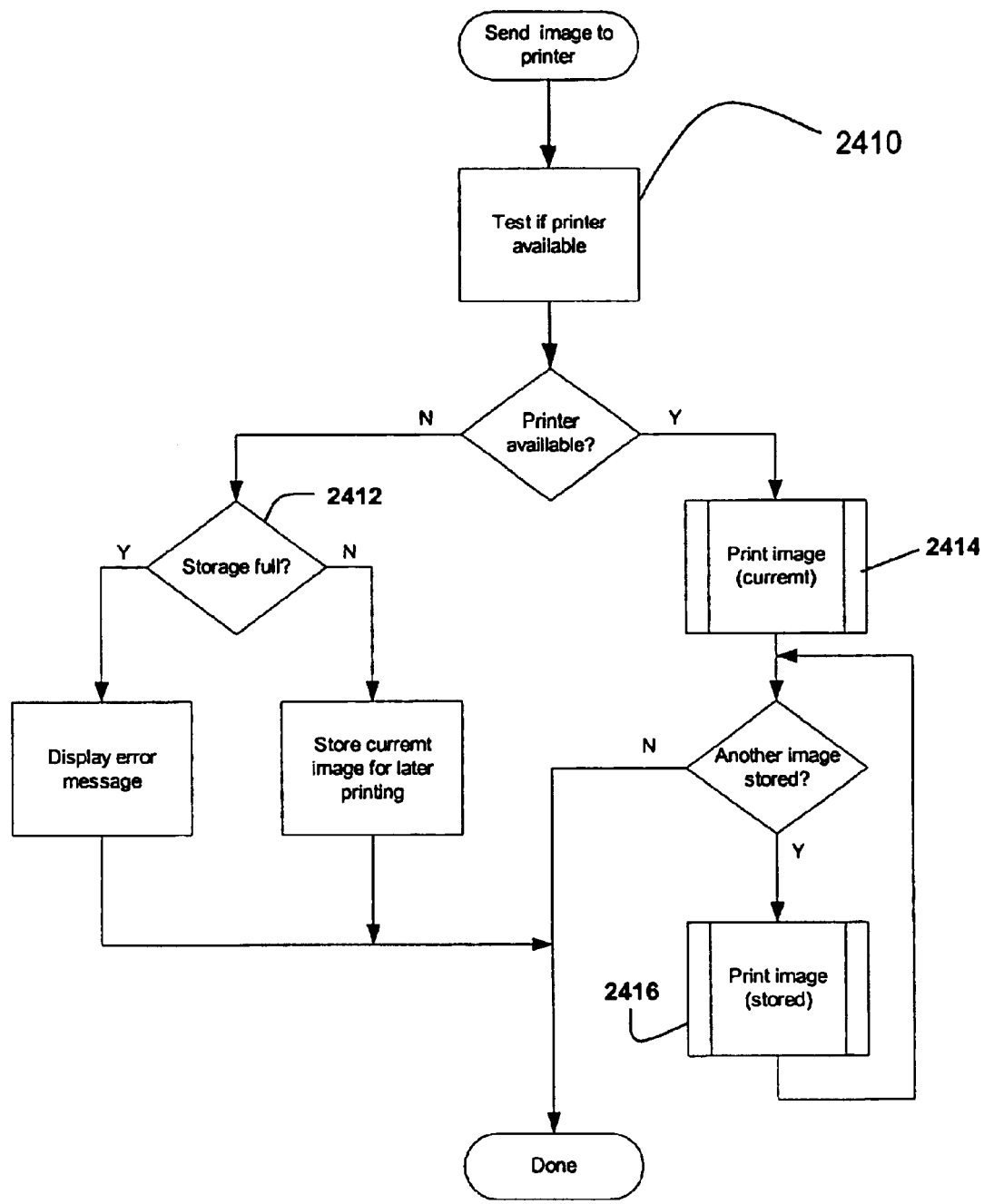
FIG. 24 illustrates an exemplary process for sending an image, and more generally data, to a printer.
Figure 25:
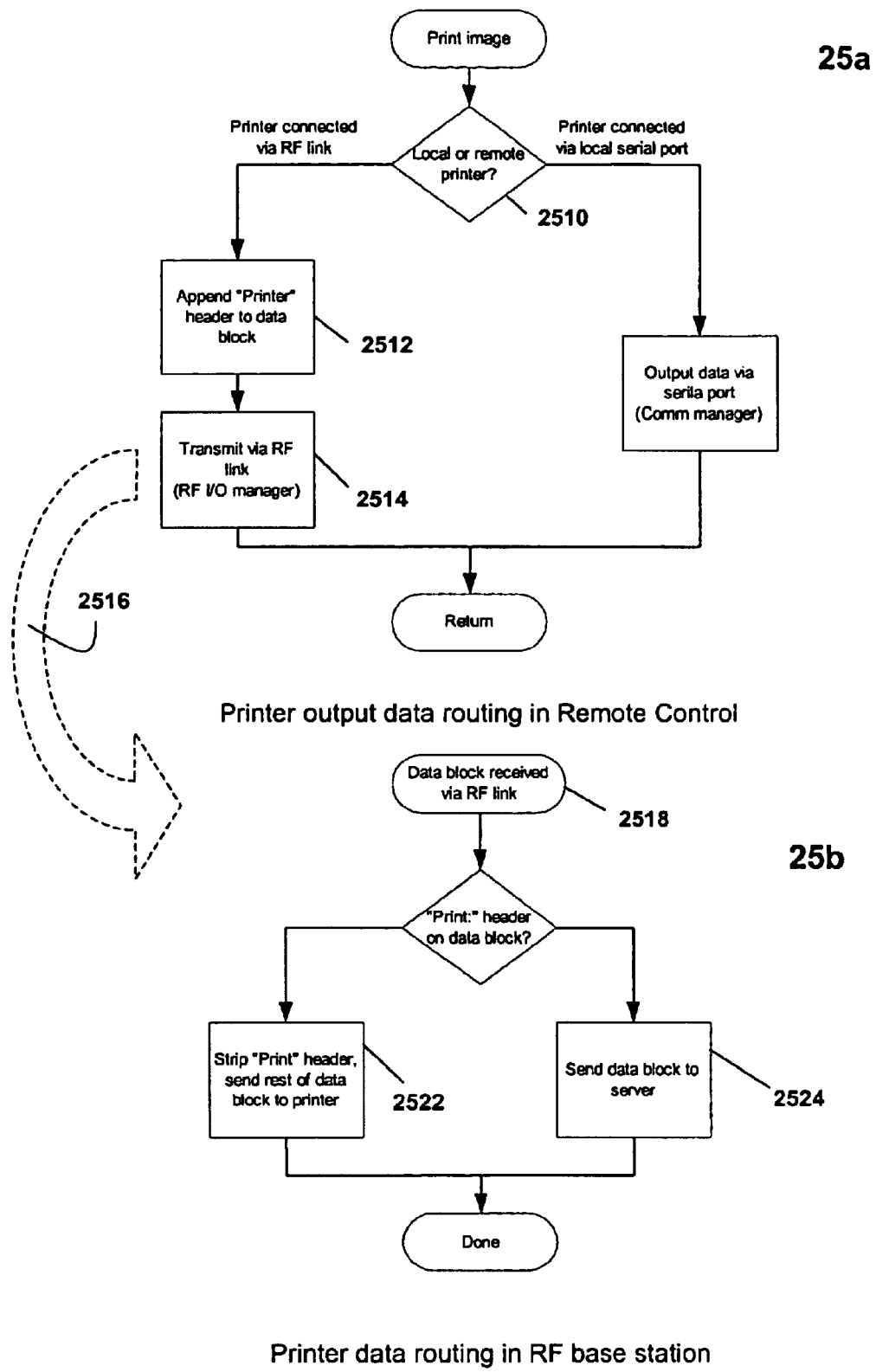
FIG. 25 illustrates an exemplary process for outputting an image from the remote control.
Figure 26:
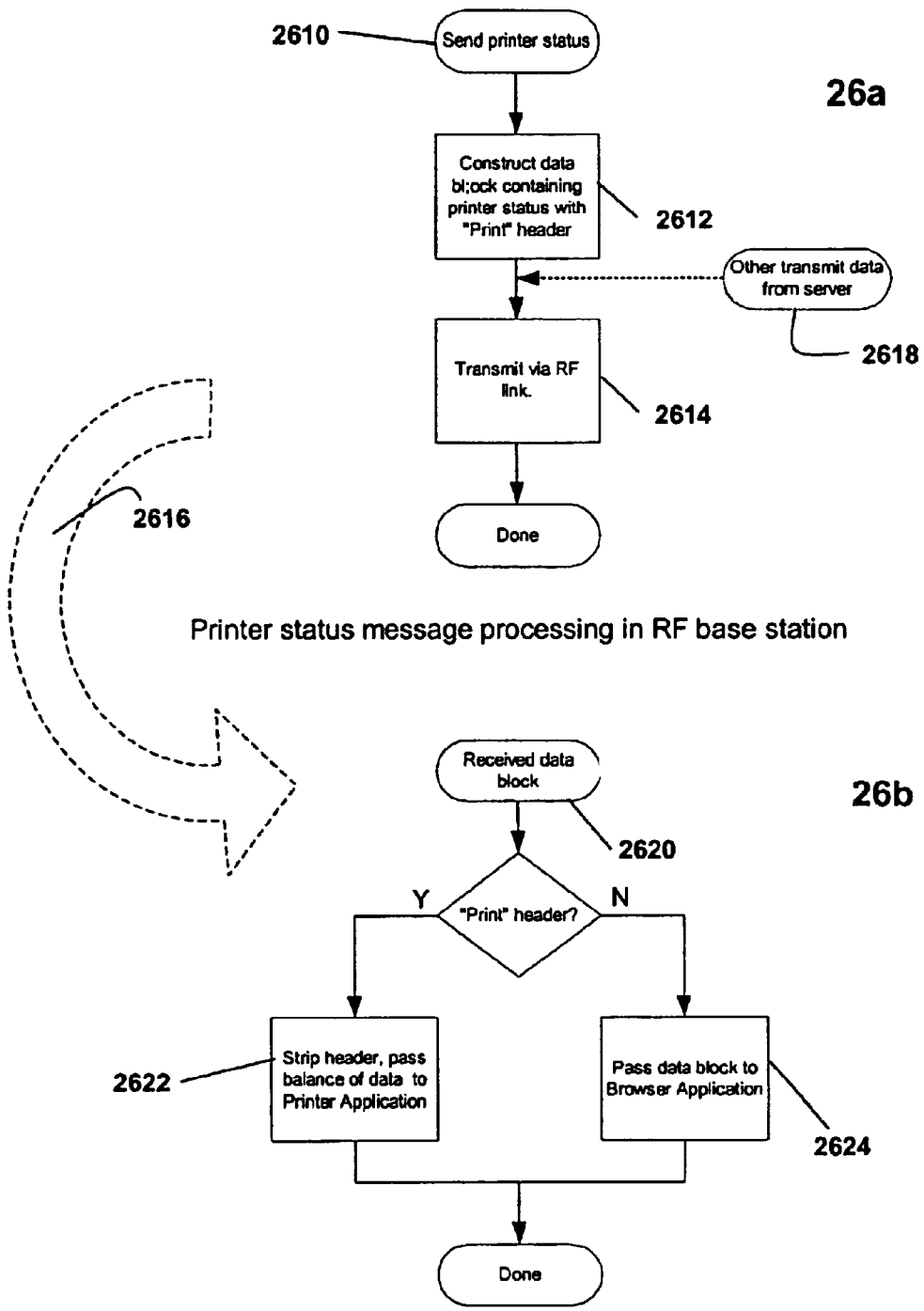
FIG. 26 illustrates an exemplary process for communicating print status.

FIG. 22 shows a remote control 10 displaying a coupon 740 and "Print" button/icon 2200. When a user selects the print icon 2200 (see also FIGS. 10a and 10b) the "Send Image to Printer" request/command, which results in printing only the active region of the display, is processed as depicted in FIGS. 24 through 26. A complete screen dump of the display may also be printed. The bar code is preferably formatted using HTML and HTML TAGS. For many applications it is desirable to send the bar codes as data rather than screen dumps. The printer 710 or the printer module 706 (or 706' in FIG. 23) is then provided with software algorithms for printing out various industry standard formatted bar codes. This approach ensures bar code compatibility with pre-existing retail infrastructures, or subsequently determined infrastructures.

FIG. 23 illustrates two configurations by which the remote control 10 may interface with a printer 710. Configuration 1 is representative of a system configuration where the remote control 10 interfaces with the printer 710 via a physical connection, such as contacts 704 of docking station 700 (which is preferably also a charging base equipped with contacts to mate with the remote control's recharging contacts 107); configuration 2 is representative of a wireless interface where the data is sent through printer control module 706' (which is associated with a base station). Thus, print capability may be utilized without the requirement of docking the remote control 10.

To effect printing remotely, the remote control 10 appends a "print data" header to a data block and transmits it over a wireless link, preferably a RF link. If multiple components are connected in the hardwired configuration, the remote control 10 may be adapted to append the appropriate header, for example "scanner data" or "display monitor data" where the print module 706 is more generally an output module that routes the data from the remote control as necessary. Additional data formatting, if desired, can then be performed in the output module or the output device, e.g., the printer.

FIG. 24 illustrates a basic process of sending an image (such as coupon 740) to printer 710. The remote control 10 tests if a printer is available (Step 2410). Depending on the system configuration, i.e., whether the remote control is docked in docking station 700 or not, the printer available test will comprise sensing printer status via either serial interface contacts 104 (for example) or the RF link through RF antenna 52. The printer may be unavailable for a variety of reasons, for example if the remote control 10 is not docked, it is out of RF range with the base station, or the printer is communicating but has no paper. If the printer is unavailable, the remote control 10 attempts to store the requested data output for later printing, if, for example, memory is available (Step 2412). If the printer is available, the remote control 10 transfers the current data (Step 2414) and any previously stored data (Step 2416).

FIG. 25 illustrates how the data is output by the remote control 10 (block diagram 25a) along with how the data is handled by a base station (block diagram 25b). The remote control 10 determines if the data will be sent remotely or locally (Step 2510). Depending of the application, it may be desirable to send data remotely, to a remote base station, even while the remote control 10 is docked in docking station 700. For other applications, the remote control automatically configures itself to send data either locally or remotely depending on whether or not it is docked.

If the data is not sent locally (and it is desired to print it because the print icon 2200 was selected) the "Printer" header is appended to the data (Step 2512). The data is transmitted (Step 2514) via RF link 2516 to the base station. The printer module 706' receives the data block (Step 2518) and tests for an output header, specifically a "Printer" header (Step 2520). If a "Printer" header is detected, the header is stripped off and the data is routed to the printer 710 (Step 2522). If a "Printer" header is not detected, the data can be sent to a personal computer, set-top box, game console with Web access, home gateway, etc. acting as a server 1420 which is linked to the base station (Step 2524). To increase system flexibility it is desirable if the destination device communicate status to the remote control 10.

FIG. 26 illustrates via flow charts 26a and 26b how status 2610 may be communicated back to the remote control 10 when the remote interface configuration (configuration 2 of FIG. 23) is in use. A data block containing printer status and a "Printer" header is constructed (Step 2612). The status data is transmitted (Step 2614) via RF link 2616 (note that link 2616 is from the base station to the remote control 10 and link 2516 is from the remote control 10 to the base station). Other data from other components, e.g., from the server, may be coupled with the status data and transmitted over link 2616 (Step 2618). The remote control 10 receives the data through RF antenna 52 (Step 2620) and routes the data to the appropriate applications, e.g., server data to browser application (Step 2622) and print data to printer application (Step 2624).

While aspects of the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

What is claimed is:

1. A communication system, comprising:
   a hand-held wireless controller comprising a memory storing a plurality of command codes for use in commanding operations of a plurality of types and makes of consumer appliances; a first transmitter for transmitting signals representative of command codes directly to one or more of the plurality of consumer appliances; a receiver for receiving data to be printed; a display module comprising a touch panel through which a user selects at least one of the plurality of command codes to transmit to the one or more of the plurality of consumer appliances via the first transmitter and for displaying an image representative of the data to be printed; and a second transmitter for transmitting data;
   a printer;
   a gateway device; and
   a base station in communication with the printer and the gateway device, the base station comprising a receiver for receiving the data transmitted via the hand-held wireless device and a controller for routing the data, the data being routed to the printer when the print controller determines that the data comprises the data to be printed otherwise routing the data to the gateway device.

2. The communication system as recited in claim 1, wherein the second transmitter comprises a wireless RF transmitter.

3. The communication system as recited in claim 1, wherein the hand-held wireless controller and the base station having cooperating contacts for removeably coupling the wireless controller to the base station, the cooperating contacts being used via the second transmitter to transmit the data from the wireless controller to the base station.

4. The communication system as recited in claim 1, wherein the hand-held wireless controller comprises a power source and wherein the base station is adapted to recharge the power source when the hand-held wireless controller is coupled to the base station.

5. The communication system as recited in claim 1, wherein the printer is integral with the base station.

6. The communication system as recited in claim 1, wherein the data to be printed comprises data representative of a bar code.

7. The communication system as recited in claim 1, wherein the printer comprises programming for printing industry standard formatted bar codes.

8. The communication system as recited in claim 1, wherein the gateway device comprises a personal computer.

9. The communication system as recited in claim 1, wherein the gateway device comprises a set-top box.

10. The communication system as recited in claim 1, wherein the gateway comprising a Web-enabled game console.

11. The communication system as recited in claim 1, wherein the base station routes the data considering a message header.

12. The communication system as recited in claim 1, wherein the data to be printed is targeted advertising.

13. The communication system as recited in claim 1, wherein the data to be printed is an order confirmation.

14. The communication system as recited in claim 1, wherein the data to be printed is stored locally in the hand-held wireless controller device until such time as communication with the base station is enabled.

15. The communication system as recited in claim 1, wherein the data to be printed comprises a coupon.

16. The communication system as recited in claim 1, wherein the data to be printed comprises driving directions.

17. The communication system as recited in claim 1, wherein the hand-held wireless controller has a browser application for displaying a mark-up language page within the display wherein the mark-up language page includes the data to be printed.

* * * * *